United States Patent [19]

Kunimaru et al.

[11] Patent Number: 4,949,203

[45] Date of Patent: Aug. 14, 1990

[54] TAPE RECORDER HAVING AN IMPROVED CASSETTE MOUNTING DEVICE

[75] Inventors: Noritaka Kunimaru; Katsuhiro Shiba; Norio Kudo; Gen Inoshita; Shogo Sato, all of Saitama, Japan

[73] Assignee: Pioneer Electronic Corporation, Tokyo, Japan

[21] Appl. No.: 166,595

[22] Filed: Mar. 10, 1988

[30] Foreign Application Priority Data

Mar. 11, 1987 [JP] Japan .................................. 62-35351
Mar. 11, 1987 [JP] Japan .................................. 62-35357
Mar. 11, 1987 [JP] Japan .................................. 62-35359
Mar. 13, 1987 [JP] Japan .................................. 62-35978

[51] Int. Cl.⁵ ................. G11B 15/665; G11B 15/675; G11B 5/027
[52] U.S. Cl. ....................................... 360/85; 360/95; 360/96.5
[58] Field of Search ................. 360/85, 95, 96.5, 96.6, 360/130.21, 130.22, 130.23

[56] References Cited

U.S. PATENT DOCUMENTS 4,796,115  1/1989  Ohshima et al. ...................... 360/85
4,814,910  3/1989  Kaku et al. ........................... 360/95

FOREIGN PATENT DOCUMENTS 247442  12/1987  European Pat. Off. .............. 360/85
52-20006  2/1977  Japan ................................. 360/95
61-11961  1/1986  Japan ................................. 360/85
61-237255  10/1986  Japan ............................. 360/96.5

Primary Examiner—John H. Wolff
Attorney, Agent, or Firm—Sughrue, Mion, Zinn, Macpeak & Seas

[57] ABSTRACT

A tape recorder including two chassis which are relatively movable from the tape loading and unloading positions is provided. One of the chassis mounts thereon a rotary drum, a capstan, a tape loading mechanism and motors for driving these segments. Another chassis mounts thereon a reel stand, a mode switching mechanism and drive motors for driving these segments. The tape loading mechanism includes first and second guide members adapted to be movable along an outer periphery of the rotary drum. The guide members have tape draw-out pins for drawing out the tape from a tape cassette and a third guide member adapted to draw out the tape in cooperation with the first and second guide members. The third guide member has a first tape draw-out pin which changes the height of the tape draw-out position to a height which is the same as that of the tape cassette position. The third guide member also has a second tape draw-out pin for directing the tape subjected to positional change by the first pin to a direction parallel with the tape cassette.

4 Claims, 15 Drawing Sheets

FIG. 4

| | | EJECT (INITIAL STATE) | STAND-BY | TAPE LOADING | FF, FR | STOP | F. PLAY | R. PLAY |
|---|---|---|---|---|---|---|---|---|
| 6 | ROTARY DRUM MOTOR | | OFF | ON | | | | |
| 20 | CAPSTAN MOTOR | | OFF | ON | | | | |
| 75 | TAPE DRAWING-OUT MOTOR | | OFF | ON | | | | |
| 76 | FEED REEL MAIN BRAKE | | CONTACT | | NON-CONTACT | CONTACT | | |
| 78 | REWIND REEL MAIN BRAKE | | NON-CONTACT | | CONTACT | | | |
| 59 | FF BRAKE | | CONTACT | | NON-CONTACT | | | |
| 80 | FEED-OUT R. BRAKE | | CONTACT | | NON-CONTACT | | | |
| 81 | R. SOFT BRAKE | | NON-CONTACT | | CONTACT | | | |
| 44 | TAKE-UP R. BRAKE | FREE, RECEIVED | FREE, RECEIVED | FREE, RECEIVED | FIXED (OUTSIDE) | FIXED (INSIDE) | FREE | FIXED (OUTSIDE) |
| 62 | TENSION BRAKE | | RELEASE | | FREE DOWN | | LOCK | |
| 40 | BRAKE LEVER | | UPPER | FREE | | CENTER UPPER | FEED-OUT SIDE | TAKE-UP SIDE |
| 46 | SWING GEAR | | | | | | PRESS CONTACT | |
| 74 | PINCH ARM | | LOCK | | | RELEASE | | |
| | CASSET BRAKE ARM | | LOCK | | | RELEASE | | |

TAPE RECORDER HAVING AN IMPROVED CASSETTE MOUNTING DEVICE

BACKGROUND OF THE INVENTION

This invention relates to an improvement on a tape recorder such as a video tape recorder and a digital audio tape recorder. More particularly, the present invention relates to an improvement on a tape draw-out mechanism for drawing out a tape from a tape cassette and winding a predetermined length of the tape around a rotary drum in a tape recorder such as a video-tape recorder and a digital audio tape recorder in which a tape is drawn out from the tape cassette and is wound around the rotary drum for recording and reproduction. This invention also relates to an improvement on a drive system in a video/digital audio tape recorder. This invention relates to an improvement on a cassette mounting device for mounting a tape cassette in a tape recorder such as a video tape recorder and a digital audio tape recorder. The present invention also relates to a main brake mechanism for preventing reel stand from rotation in a brake of a tape recorder such as a video tape recorder, a digital audio tape recorder and a compact tape recorder.

In a tape-recorder of this kind such as a digital audio tape recorder, a rotary drum is slantingly provided on a chassis. In order to wind a tape around the slanting rotary drum, the tape must be wound at a position lower than that of the tape cassette.

For this, the tape position must be elevated to the position of the tape cassette for taking up the tape at the tape cassette, since the tape passing over the rotary drum is positioned lower than the tape position in a reel stand in the tape cassette.

For the elevation of the tape position, according to a conventional tape draw-out mechanism a single tape draw-out pin 35d is provided at a guide member 35 for raising the position of the tape wound around the rotary drum to a raised position and then the tape is directed in horizontal direction as shown by a phantom line in FIG. 23. Therefore a long distance L is required from the terminal end position of the drum 4 to a tape pull-out pin 35d. However the large length L is disadvantageous in realization of the compact tape recorder.

Also in a conventional tape recorder, there are provided a tape draw-out unit which includes a pinch roller, a tension regulator, a guide member movable along the outer peripheral surface of a rotary drum, and a third guide member supported on a capstan shaft and movable in association with the pinch roller. The draw-out members all start movements simultaneously, and all stop movements simultaneously.

Therefore, tape withstand from a complicated path is travelled through a complexed path for winding the tape by a predetermined length over the rotary drum. Particularly, in case where the rotary drum is slantingly directed as seen in the digital audio tape recorder, it would be troublesome to perform positional alignment between the tape and the rotary drum. Therefore, a more complexed device is required rendering the overall mechanism complex.

According to a conventional tape recorder, tape loading is made for recording and reproducing information with a tape, tension is applied to the tape, and the tape is conveyed at a constant speed. Further a chassis must be moved for providing a compact tape recorder.

However, in the conventional tape recorder, at least two motors are required for controlling these various operations. Therefore, it would be difficult to adjust sequential timing for moving various segments. If the timing is deviated or offset, it becomes impossible for recording and reproducing information. Further, great numbers of segments (motors) are required, to increase production cost.

According to a conventional tape recorder of this kind, a single motor performs various operations to reduce production cost.

Therefore, since the single motor controls mode switching as well as tape loading, it would be difficult to precisely control braking operations in accordance with various modes. Further it takes much time for switching operation in the mode switching operation, and accordingly, smooth mode change may not be obtainable.

In a tape recorder such as video/digital audio tape recorder in which a tape is withdrawn from a tape cassette, the pinch roller is pivotally moved to a predetermined position at the tape withdrawing operation, and then, the pinch roller is again moved to be brought into pressure contact with the capstan in the reproducing operation.

Therefore in such a conventional tape recorder, the above described pinch roller drive system is not applicable.

In a conventional mechanism for press contacting a pinch roller with a capstan, a single member is operated, or, alternatively, dual operational stages are provided in which the pinch roller is brought to a position close to the capstan by moving a head slide having a head in a first operational stage, and the pinch roller is pressed against the capstan by a rotational force of an arm movable by a suitable drive means in a second operational stage.

In a tape recorder such as a video tape recorder and a digital audio tape recorder, a movable chassis having a tape drive means such as reel stands etc. mounted thereon, is slidingly movable on a stationary chassis having thereon a capstan and a magnetic head mounted thereon. In this conventional structure the movable chassis is moved on the stationary chassis during the tape loading operation where the tape cassette is mounted in the movable chassis, or after the loading. For mounting the tape cassette onto the movable chassis, a cassette holder is used.

According to a conventional cassette holder, there is provided a first holder portion, a second holder portion and a locking means. The first holder portion is provided on the movable chassis for directly holding the tape cassette and for assembling the same onto a reel stand. The second holder is provided on the stationary chassis for holding the first holder and for opening and closing the same and for urging the latter to a predetermined position. The locking means is provided on the stationary chassis for maintaining closing state of the second holder.

Therefore, since the first and second holders and the locking means are provided in the cassette holder, large numbers of mechanical parts are required assembling work becomes troublesome, and production cost is increased. Further, heavy weight product results which is not appropriate for portable tape recorder.

In a tape recorder, two main brakes are provided for a supply reel and a take-up reel. The two main brakes must be spaced away from the reel stands in quick feed, rewinding, forward play and reverse play modes. Further, the brakes must be in pressure contact with the reel stands in the stop mode. Furthermore, the main brake must be in pressure contact with one of the reel stands (for example, a supply reel stand) for withdrawing a tape from the reel stand and for winding the tape in tape loading or unloading mode.

According to a conventional brake mechanism, one of the main brake is controlled by a cam, so that the other main brake is moved by the main brake, whereby both brakes are cooperably pressed against the reels, or spaced away therefrom. Further, in the tape loading or unloading mode, one of the main brakes is moved away from the reel by another mechanical member.

In the conventional brake mechanism, required are a slider having a cam for controlling the brakes and other segments for controlling one of the brakes. As a result, a large number of mechanical segments are required to thereby increase production cost. Further, overall mechanism becomes complex, and the mechanism may apt to be damaged.

OBJECTS AND SUMMARY OF THE INVENTION

It is therefore an object of this invention to overcome the above-mentioned drawbacks, and to provide an improved tape draw-out mechanism in a tape recorder, in which vertical position of the tape passing through the rotary drum can be aligned with the vertical position of a tape cassette, in spite of reduction in path length of the tape, and distortion of the tape can also be eliminated so that compact tape recorder is obtainable.

Accordingly in the present invention there are provided a third guide member in addition to first and second guide members, and a pair of tape draw-out pins secured to the third guide member. The first and second guide members are disposed at positions along an outer peripheral surface of a rotary drum, and the third guide member cooperates with the first and the second guide members. The third guide member is positioned at the downstream side of a capstan at the tape draw-out position. In the tape draw-out position, the position of the tape is aligned with the tape cassette position by the pain of tape draw-out pins.

It is an object of this invention to overcome the drawbacks and to provide an improved tape draw-out mechanism in a tape recorder, in which a third guide member draws out a tape prior to the draw-out operation by other tape-draw-out member for aligning the tape position with the rotary drum in terms of their height, to thus enable rapid and stabilized tape winding operation over the rotary drum by a predetermined length of the tape, as well as to provide simplified construction.

It is an object of this invention to overcome these drawbacks and to provide an improved tape recorder in which a single motor drives a cam gear which controls segments attributable for the timing, so that tape drive timing is optimumly controllable with reducing mechanical parts.

In order to attain the object, a tape recorder according to this invention provides a single cam gear which operates a tape loading and moves a pinch roller toward a capstan, a tension arm and one of the double stage chassis.

It is an object of the invention to overcome this drawbacks and to provide an improved tape recorder in which various drive motors are provided for the various operation modes for providing optimum brake control, and mode switching operation can be promptly performed with stabilized fashion.

In order to attain the object, a tape recorder of this invention includes two chassis which are relatively movable from the tape loading and unloading positions, and one of the chassis mounts thereon a rotary drum, a capstan, a tape loading mechanism and motors for driving these segments, whereas another chassis mounts thereon a reel stand, a mode switching mechanism and drive motors for driving these segments.

It is an object of this invention to overcome this drawbacks and to provide a cassette mounting device in a tape recorder, in which mechanical segments are reduced, to thereby lower production cost and weight of the entire device.

To attain the object, a cassette mounting device in a tape recorder of this invention includes a cassette holder disposed opened and closed on a movable chassis which is slidable on a stationary chassis, and a locking means also disposed on the movable chassis for preventing the cassette holder from its opening.

BRIEF DESCRIPTION OF THE DRAWINGS

FIG. 4 is a timing-charge diagram;

FIG. 12 is a plan view showing brakes shown in;

DESCRIPTION OF THE PREFERRED EMBODIMENTS

Figure 1:
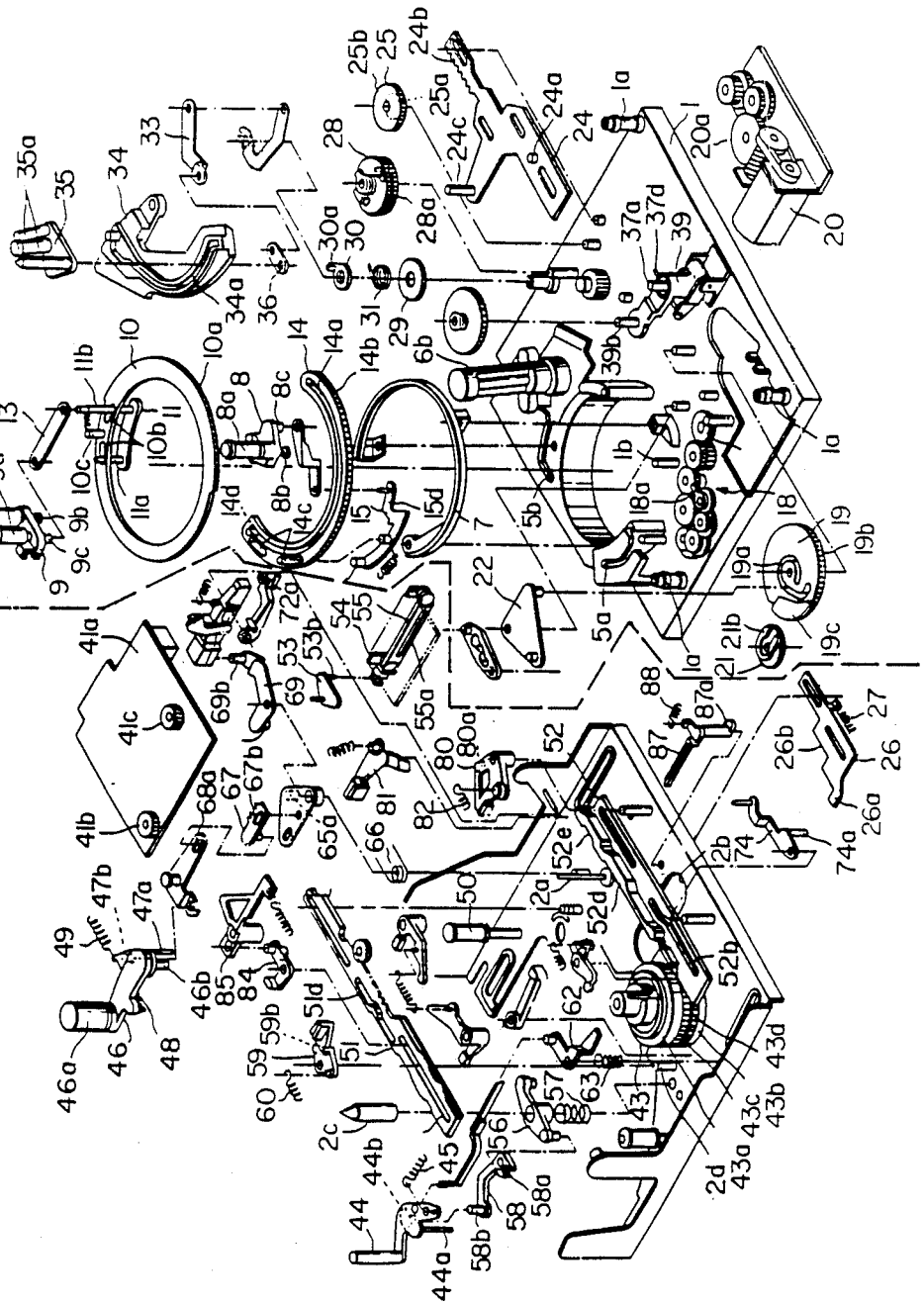
FIG. 1 is an exploded segmentally perspective view showing overall components.
Figure 1A:
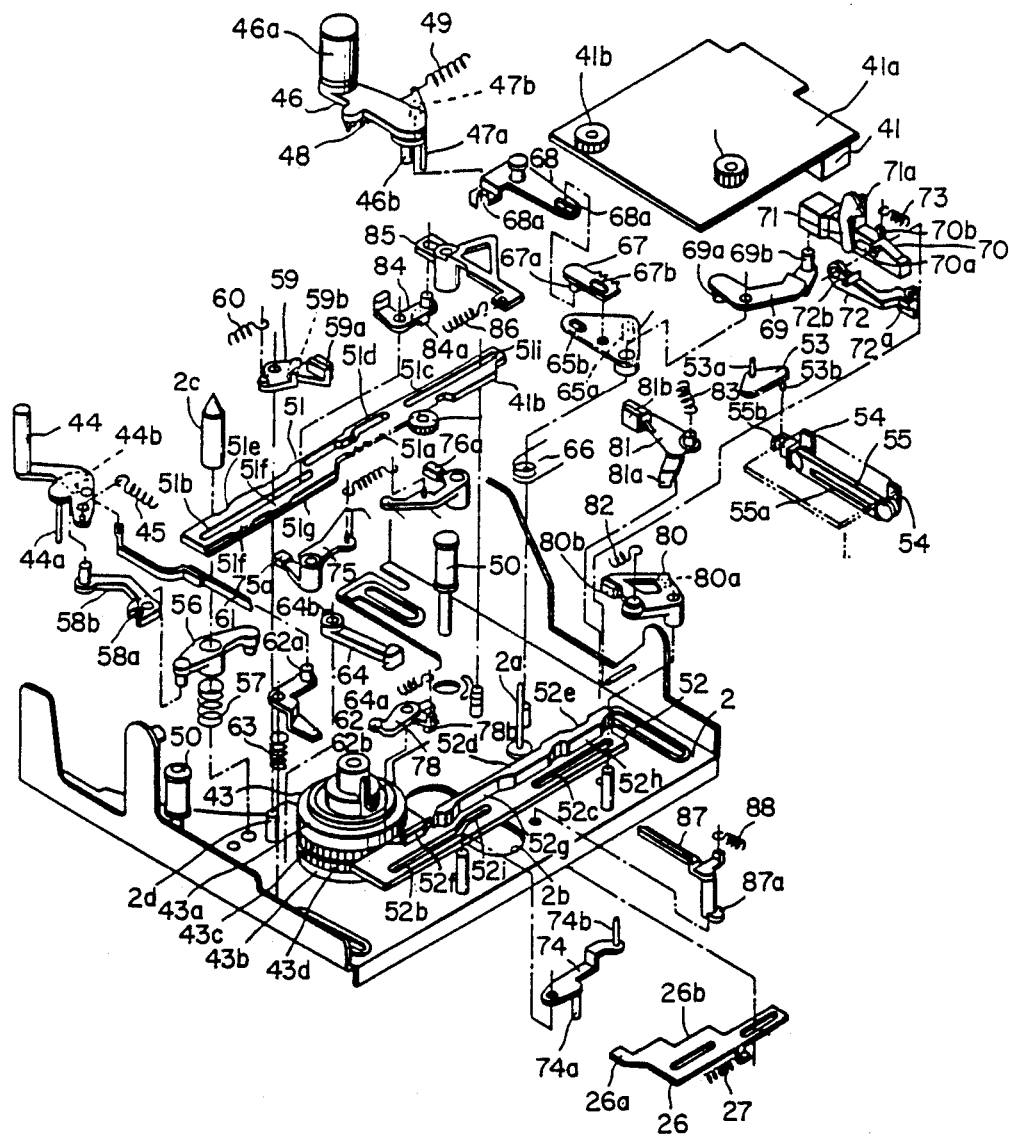
FIGS. 1a and 1b are close-up exploded segmentally perspective views of the components of FIG. 1.
Figure 1B:
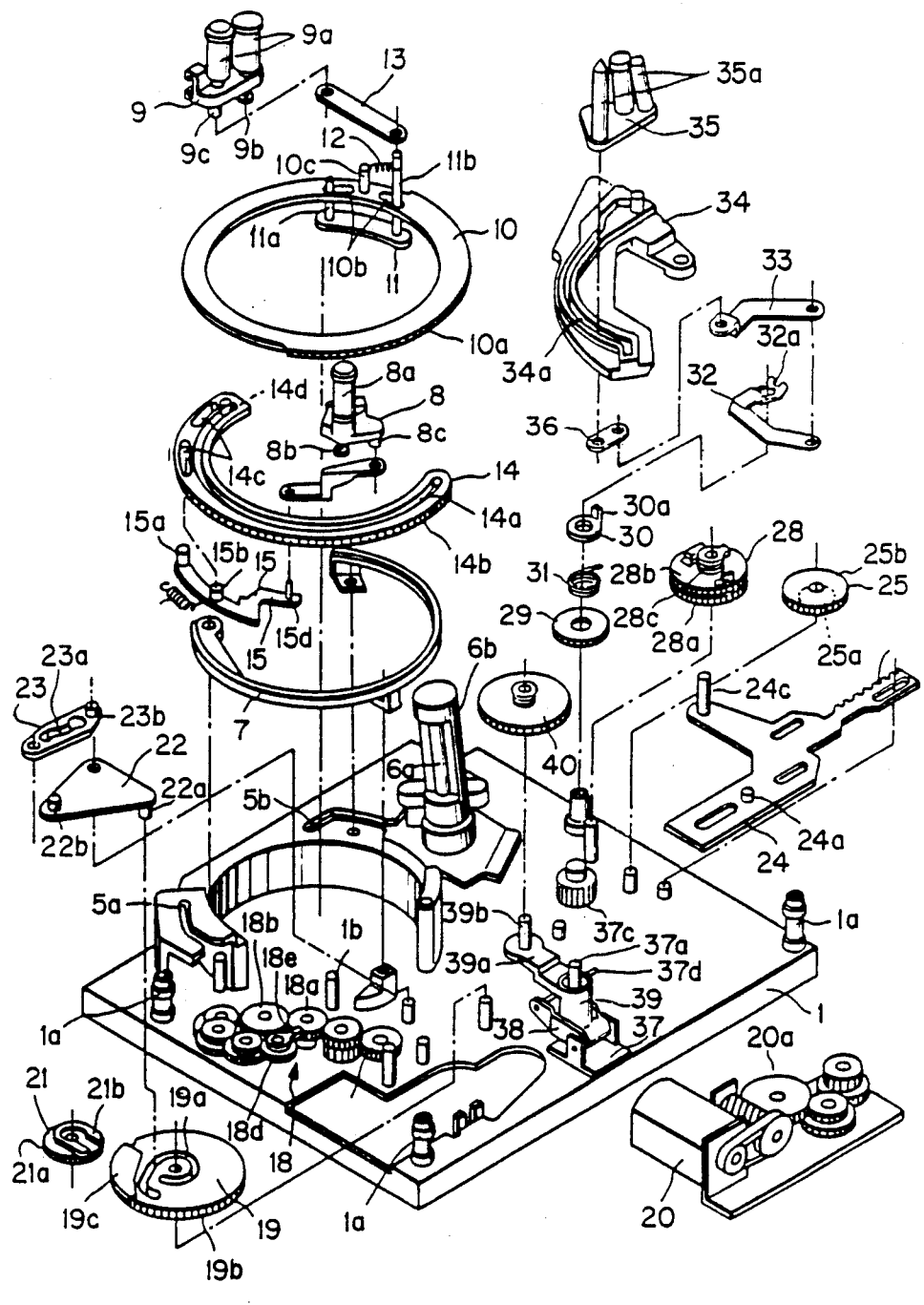

One embodiment according to this invention will be described with reference to FIGS. 1, 1a, 1b, 2 and 3.

Reference numeral 1 designates a stationary chassis. A movable chassis 2 is slidably movable within a predetermined stroke with respect to the movable chassis, and is supported by four guide legs 1a implanted on the stationary chassis 1. A cassette holder 3 is opened and closed with respect to the movable chassis 2.

A drum 4 having a magnetic head is fixed to a fixing stand 5 fixed to a front portion of the stationary chassis.

A capstan motor 6 has a capstan shaft 6a extending from an upper surface of the stationary chassis together with a capstan holder 6b.

A guide rail 7 having generally semi-circular shape is mounted on the fixing stand 5 in a bridge form. A pair of guide members 8 and 9 are suspended from the guide rail and are slidably movable with respect thereto. Incidentally, the guide members 8 and the guide member 9 are provided with a single tape draw-out pin 8a and dual tape draw-out pins 9a, respectively. Further these guide members 8 and 9 have their lower portions provided with guide pins 8b, 9b, respectively. When the guide members 8 and 9 are disengaged from the terminal end portion of the guide 7, the guide pins 8b and 9b are inserted into guide grooves 5a 5b formed in the fixing stand 5.

A ring gear 10 is rotatably supported on an outer peripheral surface of the fixing stand 5 through a plurality of guide rollers 5c. A gear portion 10a is formed at a semi-circular outer peripheral portion of the ring gear 10. Two elongated slots 10b are formed in the ring gear 10 at position adjacent to one end portion of the gear portion 10a, and a pin 10c is fixed at a position between the slots 10b and 10b. An along-side plate 11 is provided with pins 11a 11b extending through the elongated slots 10b. Therefore the along-side plate 11 is movable relative to the ring gear 10. At the same time, a spring 12 is provided between the pin 10c of the ring gear 10 and one of the pins 11b. Further, one end of a connecting arm 13 is pivotally supported to the pin 11b and another end of the connecting arm 13 is pivotally supported to the pin 9c of the guide member 9.

A ring like semi-circular gear plate 14 is formed with a guide hole 14a which is slidingly supported by two bearing pins 1b fixed to the stationary chassis. The gear plate 14 is formed with a gear portion 14b at its outer peripheral portion. Further two elongated slots 14c are formed at one end portion of the gear plate 14. An alongside plate 15 is movably arranged with respect to the gear plate 14 because of insertion of two pins 15a, 15b extending from the along-side plate 15 into the elongated slots 14c. At the same time, a spring 16 is provided between a lower portion of one of the pins 15b and a pin 14d extending from a lower surface of one end portion of the gear plate 14. Further, the along side plate 15 is integrally provided, through an upstanding portion, with an extension piece 15c positioned above the upper surface of the ring gear 10, and a pin 15d extends from an upper surface of the extension piece 15c. A connection arm 17 has one end portion pivotably supported to the pin 15d and another end portion pivotably supported to the pin 8c extending from the guide member 8.

A gear train 18 is rotatably supported to the stationary chassis 1. A third gear 18a is meshingly engaged with the gear portion 10a of the ring gear 10, and a fourth gear 18b is meshingly engaged with the gear portion 15b of the gear plate 14. An eighth gear 18d of the gear train 18 is provided with a projection 18e which is engageable with an engagement pin 44a suspended from a tension arm 44 pivotably supported to the upper surface of the movable chassis.

A cam gear 19 is connected to a tape drive motor 20 through a deceleration gear 20a. The cam gear 19 is formed with a cam groove 19a at its upper surface. Further, a gear portion 19b is provided in the cam gear 19, and a planar portion 19c is formed at a portion of the cam gear 19. The planar portion 19c is formed radially outwardly relative to the gear portion 19b.

A gear portion 20a of a transmission gear 21 is in meshing engagement with the cam gear 19 and a first gear 18c of the gear train 18. A U-shaped engagement rib 21b is formed on the upper surface of the gear 21. Further, tip end of the engagement rib 21b extends up to the gear portion 21a of the gear 21. Upon rotation of the transmission gear 21 by the rotation of the cam gear 19, the gear train 18 is rotated, so that the ring gear 10 and the gear plate 14 are rotated in directions opposite to each other. When the ring gear 10 is rotated, the guide member 9 is moved along the guide 7 through the along-side plate 11 and the connecting arm 13. Further, the guide member 8 is also moved along the guide 7 through the along-side plate 15 and the connecting arm 17. When the planar portion 19c of the cam gear 19 is brought into confrontation with the tip end of the engagement rib 21b, the guide members 8 and 9 are stopped where the guide members 8, 9 are guided by the guide grooves 5a, 5b of the fixing stand 5. In this case, the guide members 8 and 9 are biased by the biasing forces of the springs 12 and 16. Further, in the state where the planar portion 19c of the cam gear 19 confronts the tip end of the engagement rib 21b of the transmission gear 21, the meshing engagement between the gear portions 19a and 21a are released. Therefore, the rotation of the transmission gear 21 is suspended, while the cam gear 19 is only rotated.

A triangular rotation plate 22 has a corner portion which is rotatably supported to a pin implanted on the stationary chassis 1. The triangular plate 22 has a bottom corner portion provided with a pin 22a which is inserted into the cam groove 19a of the cam gear 19. Further, the plate 22 has other bottom corner portion provided with a pin 22b which is inserted into a groove 23a of a rotary arm 23 pivotally supported to a pin implanted on the stationary chassis 1. Another end of the rotary arm 23 is provided with a pin 23b inserted into an elongated guide groove 2g formed at a bottom surface of the movable chassis 2. By rotating the cam gear 19 and completing the movement of the guide members 8, 9, only the cam gear 19 is rotated, so that the rotary plate 22 is rotated in accordance with a cam groove 19a. Further, the rotary arm 23 is rotated, so that the movable chassis 2 is moved frontwardly by the pin 23b provided at the arm 23, and is stopped at a predetermined position. Then the electric power supply to the motor 20 is shut off, and the motor is deenergized.

A slide plate 24 is slidably disposed to the stationary chassis 1. The slide plate 24 has one end provided with a pin 24a which is inserted into a cam groove 19d formed at the bottom surface of the cam gear 19. The cam groove 19d is so configured that the slide plate 24 is laterally moved in response to generally first half rotation of the cam gear 19. Further, another end of the slide plate 24 is formed with a gear teeth 24b which is in meshing engagement with a small gear 25 of a double stage gear 24 rotatably supported on the stationary chassis 1. A pin 24c is implanted at a generally center projecting piece of the slide plate 24. The pin 24c is in abutment with a projection piece 26a of a laterally movable plate 26 slidably disposed to the rear surface of the movable chassis 2. A spring 27 is provided between the laterally movable plate 26 and the movable chassis 2, so that the laterally movable plate 26 is urged toward left in the drawing.

A dual separation ears 28 includes a lower gear 28a meshingly engaged with a large gear 25b of the two stage gear 25. A coil spring 28c is fixed between an upper gear 28b and the lower gear 28c, so that the upper gear 28b is urged in counterclockwise direction in a given range.

A gear wheel 29 is engaged with the upper gear 28b of the dual separation gears 28. A rotation wheel is disposed concentrical with the gear wheel 29 at an identical pivot pin. A coil spring 31 is provided between the rotary wheel 30 and the gear wheel 29, so that the rotary wheel 30 is rotatable relative to the gear wheel 29 through the coil spring 31.

A first arm 32 is formed with a recess 32a at its one end. The recess 32a is engageable with a projection 30a provided at the rotary wheel 30. Another end of the first arm 32 is pivotably connected to one end of a second arm 33.

A guide rail 34 is formed of synthetic resin, and is formed with a guide groove 34a with which a guide member 35 fixed with three tape draw-out pins 35a~35c is guided. A fixing plate 36 is provided at a position opposite to the guide member 35 with respect to the guide rail 34, and a tip end of the second arm 33 is pivotably connected to the fixing plate 36. When the slide plate 24 is moved laterally in response to the rotation of the cam gear 19, the first arm 32 is rotated, through the two stage gear 25, two stage separation gear 28, the gear wheel 29 and the rotary wheel 30. Therefore, the second arm 33 is rotated, so that the guide 35 is moved along the guide rail 34 through the second arm 33. The guide groove 34a of the guide rail 34 is so configured that the three tape draw-out pins 35a~35c of the guide member 35 are directed in parallel with one another at an initial end of the guide groove 34, and the three pins 35a~35c permit the slanting tape passing through the capstan shaft 6a to be directed in parallel with the stationary chassis at the terminal end portion of the guide groove. The coil spring 28c fixed to the two stage separation gear 28 and the coil spring 31 provided between the gear wheel 29 and the rotary wheel 30 are adapted to absorb surplus displacement of the guide member 35, and are adapted to prevent the guide member 35 from its random movement.

Figure 2:
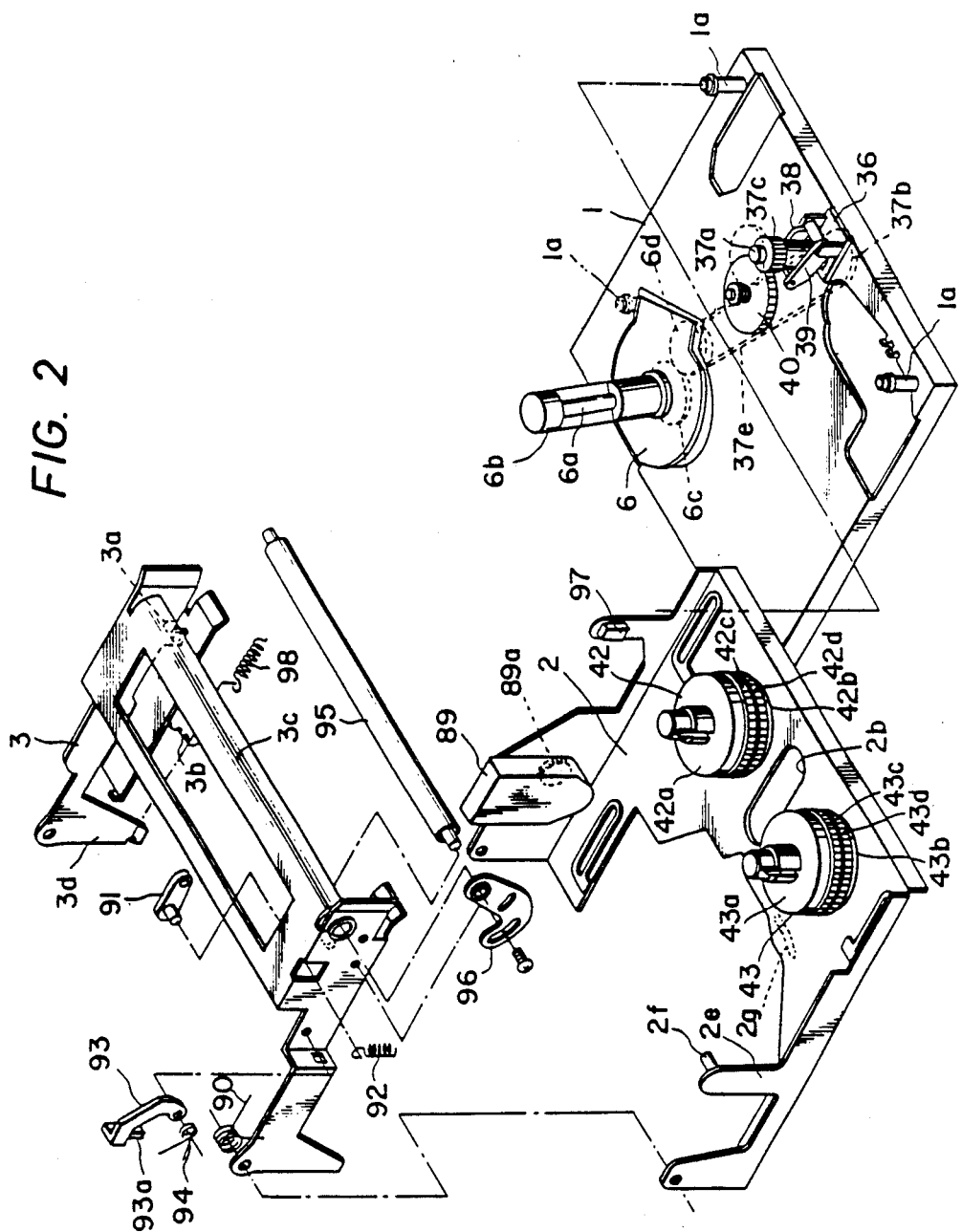
FIG. 2 is exploded segmentally perspective view also showing a cassette holder.
Figure 3:
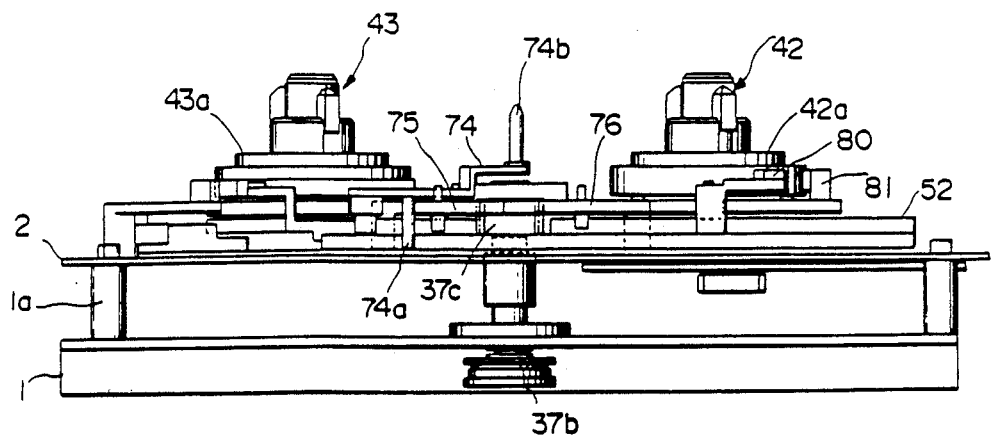
FIG. 3 is a front view.

A support stand 37 is fixedly secured to the stationary chassis 37. In the stand 37, a rotation shaft 37a is rotatably provided and a pulley 37b is provided at the lower end of the rotation shaft 37a. Further, a gear 37c having large thickness is provided to the rotation shaft 37a. The pulley 37b is connected through an endless belt 37e to a pulley 6d which is engaged with the capstan motor 6 through a gear 6c. (FIG. 2).

A bifurcated arm 38 is rotatably secured to the support stand 37, and a vertically movable arm 39 is pivotably secured to the rotation shaft 37a. The arm 39 is normally urged upwardly by a coil spring (not shown) disposed over the rotation shaft 37a.

A reciprocation gear 40 is rotatably supported to a fixed shaft 39b of an extension piece 29a of the vertically movable arm 39. The reciprocal gear 40 is meshingly engaged with the gear 37c. The reciprocal gear 40 and the gear 37c are disposed above the hole 26 of the movable chassis. The vertically movable arm 39 and the bifurcated arm 38 are connected together. The vertically movable arm 39 is moved in vertical direction in response to the vertical movement of the bifurcated arm 38. Even of the vertically movable arm 39 is moved in the vertical direction, the reciprocal gear 40 is not disengaged from the gear wheel 37c, since the latter has great thickness. As described later, the reciprocal gear 40 is selectively engageable with one of reel stands 42 and 43 described later in accordance with reciprocating direction of the reciprocal gear 40. Further, projecting pin 37d projecting from the bifurcated arm 39 is engageable with a guide groove 55a formed in a swingable lever 55 provided on the movable chassis 2.

The above described structure mainly pertains to components or segments provided to the stationary chassis 1. Next, described will be components those provided to the movable chassis 2.

A mode switching motor 41 is disposed to a lower surface of a printing board 41a. The rotation output of the motor 41 is transmitted to two output gears 41b, 41c through a speed reduction gear provide to the lower surface of the print board 41a. The printing board 41a is attached to a lower surface of the movable chassis 2.

A take-up reel stand 42 and a supply reel stand 43 are supported by the shafts 2a implanted on the movable chassis 2. Each of the reel stands 42 and 43 includes upper reel base 42a, 43a which are inserted into reel hubs of a cassette, and lower reel base 42b, 43b in contact with the upper reel base 42a, 43a through a buffer member such as a felt. Further, gear portions 42c, 43c are formed at outer peripheral surfaces of the reel stands, so that there are four gear portions 42c, 42d, 43c and 43d. The reciprocal gear 40 is selectively engageable with one of the gear portions 42c~43d. Therefore, when the reciprocal gear 40 is brought into engagement with the gear portion 42c of the upper reel base 42a of the take-up reel stand 42, the reel hub of the cassette is directly driven by the capstan motor 6. When the reciprocal gear 40 is brought into engagement with the gear portion 42d of the lower reel base 42b of the take-up reel stand 42, the reel hub of the Cassette is rotated through the buffer member. Therefore, if overtension is applied to the tape, rotational slippage occurs.

Further, the same is true with respect to the supply reel stand 43. Therefore, if tape quick feeding or quick rewinding is conducted, the reciprocal gear 40 is meshed with the gear portions 42c, 43c of the upper reel bases 42a, 43a, and if the tape is driven at a constant speed for reproduction, the reciprocal gear 40 is meshed with the gear portions 42d, 43d of the lower reel bases 42b, 43b.

A tension arm 44 is rotatably attached to the movable chassis 2. The tension arm 44 is normally urged in counterclockwise direction by a spring 45. An engaging pin 44a is suspended from a lower surface of the tension arm 44, and extends through the movable chassis 2 for engaging, a projection 18e provided at the eighth gear 18d of the gear train 18. At an initial stage, the arm 44 is rotated in clockwise direction against biasing force of the spring 45. When the eighth gear 18d is rotated, the tension arm 44 is rotated in counterclockwise direction by biasing force of the spring 45.

A pinch arm 46 is rotatably provided with a pinch roller 46a. Further the arm 46 has a pivot shaft 46b to which an auxiliary arm 47 is pivotally supported, and a spring 48 is provided between the auxiliary arm 47 and the pinch arm 46. The pivot shaft 46b is pivotally supported to the movable chassis 2. The pin 47a suspended from the auxiliary arm 47 extends through the movable chassis 2 and is engaged with a stepped portion 26b of the laterally movable plate 26. A spring 19 is provided between the auxiliary arm 47 and the movable chassis 2 for urging the auxiliary arm 47 in a clockwise direction. Further, at a generally center portion of the auxiliary arm 47, an engagement pin 47b is suspended which is engageable with a forked portion 68b of a pinch depression arm 68 described later. With the structure, at the initial operational phase, the stepped portion 26b of the laterally movable plate 26 prevents the auxiliary arm 47 from being rotated in clockwise direction against the biasing force of the spring 49. When the laterally movable plate 26 is moved leftwardly, the pin 47a is disengaged, so that the auxiliary arm 47 is moved in clockwise direction by the biasing force of the spring 49. Accordingly, the pinch arm 46 is rotated together with the auxiliary arm 47 by the spring force of the spring 48. Further, when the auxiliary arm 47 is rotated by the biasing force of the spring 49, the engagement pin 47b is brought into engagement with the forked portion 68b of the pinch control plate 68.

Incidentally, a tape guide pin 50 is implanted to the movable chassis 2 for guiding travel of the drawn out tape.

First and second sliders 51 and 52 is slidably disposed in lateral direction on the upper surface of the movable chassis 2, and are formed with rocks 51a and 52a, respectively. These racks are respectively engaged with output gears 41b, 41c positioned above the upper surface of the movable chassis 2.

The first slider 51 is formed with first and second guide grooves 51b, 51c for slidably moving the slider 51 relative to the movable chassis 2, and a control groove 51d positioned between the guide grooves 51b and 51c. The first slider 51 also provides a first cam portion 51e positioned at one side which is closer to the tension arm 44 than the other side, second and third cam portions 51f, 51g positioned at a side which is close to the supply reel stand 43, and a fourth cam portion 51h positioned at a side which is close to the take-up reel stand 42.

At an end portion of the second guide groove 51c, a deformed-shaped groove 51i is formed.

A triangular rotary plate 53 is pivotally supported to the lower surface of the movable chassis. The plate 53 implants a pin 53a which is inserted into the control groove 51d. A pin 53b is implanted at the lower surface of the rotary plate 53. The pin 53b is engaged with a latch portion 55b formed at a swing lever 55 pivotally supported to tip ends of a pair of levers 54 pivotally supported to the lower surface of the movable chassis 2. Further, the swing lever 55 is formed with a guide groove 55a into which the projection pin 37d of the support stand 37 is inserted. Therefore, when the first slider 51 is laterally moved, the rotary plate 53 is rotated for falling down the swing lever 55, so that the support stand 37 is rotated through the projection pin 37d. Accordingly, the vertically movable arm 39 is moved in vertical direction, so that the reciprocal gear 40 is brought into engagement with one of the upper and lower gears 42c, 43c and 42d, 43d of the take-up reel stand 42 and the supply reel stand 43.

A rotation arm 56 is rotatably supported to a position adjustment pin 2c of the movable chassis 2, and is biased in a clockwise direction by a spring 57 secured to the position adjustment pin 2c. One end of the rotary arm 56 is in pressure contact with the cam portion 51e of the first slider 51, whereas the other end of the arm 56 is engaged with the forked portion 58a of the rotation preventive arm 58 which prevents the tension arm 44 from its rotation. Since the rotation preventive arm 58 is pivotally arm 56 is rotated against the biasing force of the coil spring 57 by the sliding movement of the first slider 51, the rotation preventive arm 58 is positioned on a rotational locus of the tension arm 44, so that the projection 58b provided at the tip end of the rotation preventive arm 58 is brought into engagement with the locking projection 44b provided at the lower surface of the tension arm 44. Thus, the rotation of the tension arm 44 is prevented for limiting tension application to the ape.

A supply-side reversal brake piece 59 is rotatably supported by the pin 2d which is in sliding contact with the first slider 51 (groove 51b). The brake piece 59 has one side provided with a brake pad 59a. The other side of the brake piece 59 is provided with a projection 59b which confronts the composition 51f of the first slider 51. The supply-side reversal brake 59 is connected with a spring 60, so that the brake pad 59a is normally urged toward the supply reel stand 43.

One end of a web-like tension brake 61 is connected to the tension arm 44, while the other end of the tension brake is connected to a projection 62a of a brake lever 62. The brake lever 62 is rotatably supported to the movable chassis 2, and is biased by a coil spring 63 in clockwise direction. The other end 62b of the brake lever 62 is brought into abutment with a head portion 64a of a control lever 64 rotatably supported to the movable chassis 2 by the biasing force of the coil spring 63. The control lever 64 has a bent portion 64b which abuts the cam portion 51g of the first slider 51.

With the structure, when the first slider 51 is slidingly moved, the supply-side reversal brake piece 59 is rotated by the cam portion 51f, so that the brake pad 59a is moved away from the supply reel stand 43. Further, the tension brake 61 is moved away from the supply reel stand 43 through the control lever 64 and the brake lever 62. As a result, rotational torque of the supply reel stand 43 is controlled.

A triangular plate 65 has one corner portion pivotably supported to the movable chassis 2, and a biased by a coil spring 66 is a counterclockwise direction. The one corner portion is provided with a pin 65a which is in pressure contact with the cam portion 51h of the first slider 51 by the biasing force of the coil spring 66. A control plate 67 has one end provided with a pin 67a which is inserted into an elongated slot 65b formed at remaining one of corner portions of the triangular plate 65. The control plate 67 has another end portion formed with an elongated slat 67b which is fixed with a screw extending from a control portion of the triangular plate 65. The pin 67a of the control plate 67, which pin 67a extends through the elongated slot 65b of the triangular plate 65, is inserted into the elongated slot 68a of the pinch control plate 68 rotatably supported to the movable chassis 2. This pinch control plate 68 has L-shape configuration, and has the forked portion 68b at its tip end engaged with the locking pin 47b of the auxiliary arm 47 as described above.

With the structure, when the laterally movable plate 26 releases the engagement with respect to the pinch arm 46, and the pinch arm 46 is rotated by the spring 49, the locking pin 47b of the auxiliary arm 47 is inserted into the forked portion 68b of the pinch control plate 68. In this state, when the first slider 51 is slidingly and the pinch control plate 68 is rotated in counterclockwise direction upon rotation of the triangular plate 65 through the control plate 67, the forked portion 68b of the pinch control plate 68 pulls the auxiliary arm 47 in clockwise direction because of the engagement between the forked portion 68b and the locking pin 47b. Therefore, the pinch arm 46 is also rotated, by way of the spring 48, in clockwise direction, so that the pinch roller 46a is brought into pressure contact with the capstan shaft 6a by the biasing force of the spring 48.

Incidentally, angular rotation of the pinch control plate 68 is controllable by controlling clamping position between the control plate 67 and the triangular plate 65 by means of the screw engaged with the slot 67b. Therefore, the position of the forked portion 68b of the pinch control plate 68 is controllable with respect to the rotational locus of the locking pin 47b of the auxiliary arm 47. Accordingly, locking engagement between the locking pin 47b and the forked portion 68b is performable without fail when the pinch arm 46 is rotated by the spring 49.

A holder release lever 69 is rotatably supported to the pin which rotatably supports the triangular plate 65. One end of the lever 69 is provided with a pin 69a which is inserted into the second guide groove 51c formed in the first slider 51. A lock-release slider 70 is slidably supported with respect to the movable chassis 2 in moving direction thereof. A pin 69b projecting from another end of the holder-release lever 69 is engaged with the slider 70. A holder lock arm 71 is provided to the movable chassis 2 so that the arm 71 posture is changeable between its falling posture and upstanding posture. The posture of the holder lock arm 71 is changeable in accordance with the frontward and rearward sliding movement of the lock-release slider 70, so that the key portion 71a is engaged with or disengaged from the pin 3a provided at the cassette holder 3. A collapsible member 72 has one end rotatably connected to pin (not shown) which is provided at the movable chassis 2 and which pin extends through an elongated slot 70a formed in the lock-release slider 70. The posture of the collapsible member 72 is changeable between its upstanding posture and lying posture. A spring 73 is provided between a locking portion 72a provided at a tip end of the collapsible member 72 and a locking portion 70b provided at a central portion of the lock-release slider 70. The spring 73 provides its biasing force which urges the lock-release slider 70 frontwardly and simultaneously urges the collapsible member 72 toward its upstanding posture.

A switch 97 provided at the movable chassis 2 is closed when the cassette holder 3 is closed and said lock release slider 70 is moved frontwardly. When the switch 97 is closed, a tape drawing-out operation from the tape cassette is initiated.

With the structure, when the first slider 51 is moved leftwardly, and the position of the pin 69a of the holder-release lever 69 is displaced relative to the deforming groove 51i contiguous with the second guide groove 51c of the first slider 51, the holder-release lever 69 is rotated in counterclockwise direction against the biasing force of the spring 73. Therefore, the lock-release slider 70 is moved rearwardly, so that the holder lock arm 71 is also rotated. As a result, key portion 71a is disengaged from the lock pin 3a of the cassette holder 3, and at the same time, the switch 97 is shut-off. Further, when the lock-release slider 70 is retracted, the collapsible member 72 is moved to its upstanding position by the biasing force of the spring 73. Thereafter, the entire mechanism is brought into an initial start-up state (stand-by mode). The first slider 51 is moved rightwardly, and the holder-release lever 69 is rotated in clockwise direction. In this case the stepped portion 72c of the upstanding collapsible member 72 is in abutment with the projecting portion 70c of the lock release slider 70, so that the slider 70 is stopped at its retracted position. Therefore, when the cassette holder 3 is opened, the switch 97 is maintained at its off state. then when the cassette holder 3 is closed, a lower surface of the cassette holder 3 pressurizingly urges the projection piece 72b formed at the collapsible member 72, to thereby fall down the collapsible member 72. In the state, the stopped portion 72c of the collapsible member 72 is retracted from a locus of the projecting portion 70c of the lock-release slider 70, so that the lock-release slider 70 is moved frontwardly by the biasing force of the spring 73, to thereby turn the switch 97 on. Simultaneously, the holder-lock arm 71 is rotated, and its key portion 71a is engaged with the lock pin 3a of the cassette holder 3 for preventing the cassette holder 3 from being opened. The lying collapsible member 72 is biased to move toward its upstanding posture by the biasing force of the spring 73. However, the projection portion 70c of the lock release slider 70 holds the stepped portion 72c(vertically high stepped portion) for preventing the member 72 from its moving.

The second slider 52 is formed with first and second guide grooves 52b, 52c for slidably moving the slider 52 relative to the movable chassis 2, and has a cam plate 52d at its side confronting the first slider 51. The cam plate 52d has one side confronting the reel stands 42, 43, which side is provided with first and second cam portions 52e, 52f, and another side provided with second and third cam portions 52g and 52h.

One end portion of the guide groove 52b is connected to a deforming groove 52i contiguous therewith.

A cassette brake arm 74 has on end portion rotatably supported to the pin 2d which slidably supports the second slider 52. The brake arm 74 release braking force in the cassette. A guide pin 74a is implanted at the lower surface of the cassette brake arm 74, and is inserted into the first guide groove 52b. The brake arm 74 has another end implanted with a brake release pin 74b which is adapted to extend with a cassette mounted on the mechanism of this invention. Therefore, when the second slider 52 is laterally moved, and the guide pin 74a is displaced by the deforming groove 52i of the first guide groove 52b, the cassette brake arm 74 is rotated, so that the brake release pin 74 releases a brake for the cassette.

Supply reel main brake 75 and take-up reel main brake 76 are rotatably supported on the movable chassis 2.

One end of the brakes 75, 76 are provided with rubber pads 75a, 76a and other ends of the brakes are provided with abutting pieces 75b, 76b, being abuttable with each other. Generally intermediate portions of the main brakes 75 and 76 are provided with control pins 75c, 76c which are in abutment with the cam portion 52g. Further, a spring 77 is provided between the control pins 75c and 76c.

With the structure, when the second slider 52 is slidingly moved in lateral direction, the control pins 75c and 76c are controlled independent of each other by the cam portion 52g, and the supply reel stand main brake 75 and the take-up side man brake 76 are rotated by the spring force of the spring 77, so that the rubber pads 75a and 76a are brought into pressure contact with the supply reel stand 43 and take-up reel stand 42 for braking action. Further, when only the control pin 75c is rotated by the cam portion 52h, to thereby move the rubber pad 75a away from the supply reel stand 43, the abutting piece 75b of the supply reel side main brake 75 pushes the abutting piece 76b of the take-up side main brake 76. Therefore the rubber pad 76a is also moved away from the take-up reel stand 42.

A quick feed brake 78 is rotatably supported on the movable chassis 2, and has a pressing portion 78a. During quick feeding of the tape, the pressing portion 78a presses the supply reel stand 43 through the tension brake 61. The brake member 78 has one end portion suspended with a projection 78b which confronts the cam portion 52f of the second slider 52. The projection 78b is pressed against the cam portion 52f by the biasing force of the spring 79. When the second slider 52 is laterally moved so that the projection 78b becomes free state by the cam portion 52f to thereby rotate the quick feed brake 78 by the biasing force of the spring 79, the pressure portion 78a is brought to press against the supply reel stand through the tension brake 51.

Take-up side soft brake 80 and take-up side rewind brake 81 are rotatably supported on the movable chassis 2. Those brakes 80 and 81 are connected to spring 82 and 83, and are provided with control pins 80a, 81a which are in abutments with the cam portion 52h and 52e of the second slider 52. These brakes 80 and 81 are provided with pads 80b and 81b in contact with the take-up reel stand 42. Therefore, when the second slider 52 is laterally moved so that the control pins 80a and 81a are free states by the cam portions 32h and 52e for rotating the brakes 80 and 81 by the biasing forces of the springs 82 and 83, the pad 80b, 81b are brought into pressure contact with the take-up reel stand 42.

The first and the second sliders 51 and 52 control various segments such as brake members against the take-up reel stand 42 and supply reel stand 43, members for preventing the tension arm 44 from its movement, and members for controlling release of the cassette holder 3. In addition to these segments, the first and seconds sliders 51 and 52 also control a member for engaging the reciprocal gear 40 with the opponent side reel stand at the mode switching operation and for keeping the reciprocal gear 40 at its neutral position at tape draw-out operation. This member will be described.

A rotary arm 84 is rotatably supported by a pin which functions as a guide for sliding movement of the first slider 51. A projection 84a extending from a lower surface of the rotary arm 84 confronts a cam portion 51f in the cam portion 51f of the first slider 51.

A reciprocal gear return member 85 is rotatably supported by a shaft of the movable chassis 2. The return member 85 is formed with a central recessed portion 85a which confronts a stationary shaft 39b which bears the reciprocal gear 40 at an advanced position of the movable chassis 2. One end of the return member 85 is coupled to the tip end of the rotary arm 84. A spring 86 is provided at a tip end of the return member 85 for rotating the latter in clockwise direction.

A reciprocal gear return bar 87 is rotatably supported by a shaft of the movable chassis 2. The return bar 87 confronts the return member 85 interposing the stationary shaft 39b therebetween. One end of the return bar 87 is provided with a projection 87a which confronts the cam portion 52j formed in the second slider 52. A spring is connected to the return bar 87 for rotating the latter in clockwise direction.

With the structure, in a state where the movable chassis 2 is moved frontwardly for overlapping the same with the stationary chassis 1, when the first and second slider 51 and 52 laterally moved, the rotary arm 84 to rates the reciprocal gear return member 85 against the biasing force of the spring 86, so that the reciprocal gear 40 is displaced rightwardly by the recessed portion 85a of the reciprocal gear return member. Further, the reciprocal gear return bar 87 is rotated against the biasing force of the spring 88, so that the reciprocal gear 40 is displaced leftwardly.

Next, a structure of the cassette holder 3 will be described. The cassette holder 3 has a known configuration which can hold a tape cassette (not shown) inserted in the tape recorder. The holder 3 has one side provided with an arcuate gear portion 3b which is in meshing engagement with a gear 89a of a damper unit 89 fixed to a side wall of the movable chassis 2. A rotational fulcrum portion at one side of the cassette holder 3 is connected to a coil spring 90, while another side of the holder 3 is provided with an extension portion 3d, and a spring 98 is provided between the extension portion 3d and the movable chassis 2, so that the cassette holder 3 is urged toward its opening direction. Therefore, when the holder lock arm 71 is disengaged from the lock pin 3a, the holder 3 is opened by the biasing force of the coil spring 90, and simultaneously, the cassette holder 3 is gradually opened by the damper unit 89.

At both side of a top plate portion 3c of the cassette holder 3, cassette pressing members 91 are rotatably provided. (In the drawing, only a left side member 91 is shown). The pressing member 91 has the tip connected with a spring 92, so that the inserted tape cassette is depressed downwardly at a vertical height lower than a predetermined standard height.

Further, a hook shaped lid opener 93 is rotatably supported to a generally center portion of the left side plate of the cassette holder for releasing a lid of the tape cassette. The opener 39 is biased downwardly by a spring 94. When the cassette holder 3 is at its opening position, a free and 93a of the lid opener 93 is positioned below the lid portion of the inserted tape cassette. When the cassette holder 3 is closed, the free end 93a of the lid opener 93 is brought into abutment with an upstanding segment 2e extending from one side of the movable chassis 2, and the lid opener 93 is rotated against the biasing force of the spring 94 to release the lid of the tape cassette.

Figure 21:
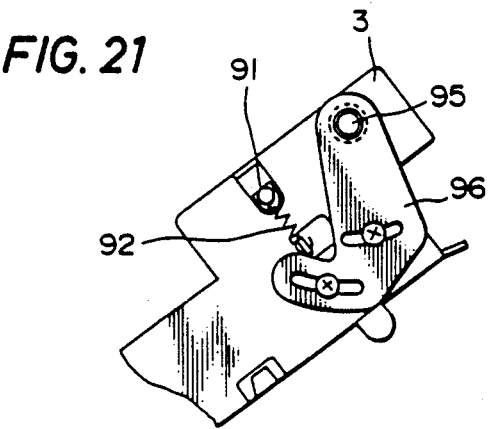
FIG. 21 is a side view showing an essential portion of the cassette holder.
Figure 22:
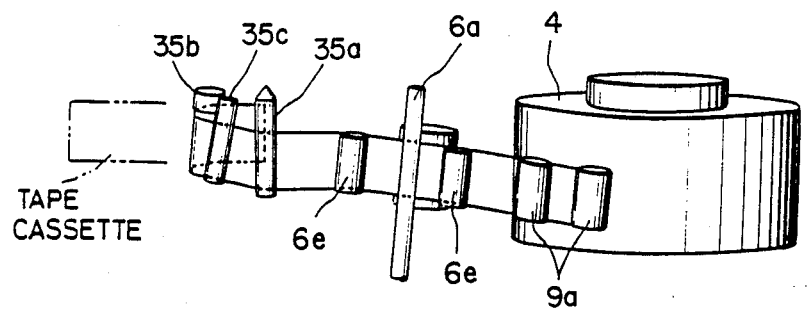
FIG. 22 is a rear view showing tape draw-out portion at downstream side of a drum.
Figure 23:
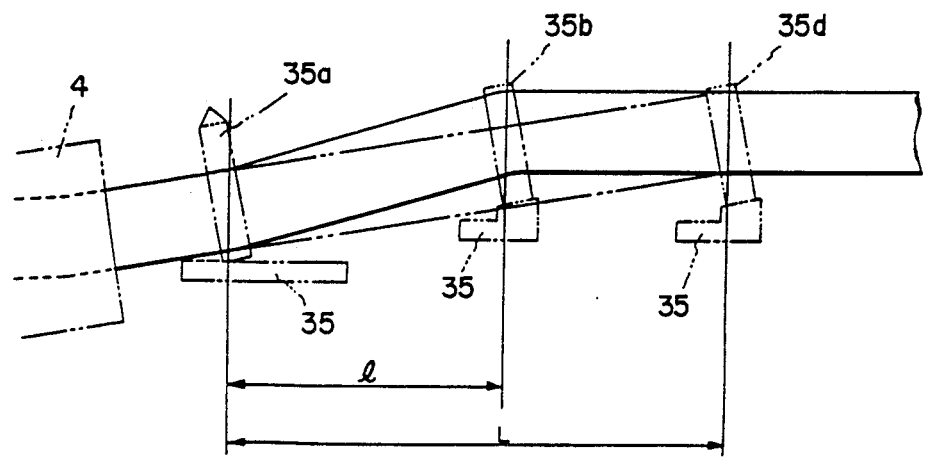
FIG. 23 is a side view showing an essential portion of FIG. 22.

A torsion rod 95 has one end portion fixed to the upper portion of the one side plate of the cassette holder 3. Another end portion of the torsion rod 95 extends through the other side plate of the cassette holder 3, and a distal end of the rod 95 is fixed with one end of a torsion plate 96. The torsion plate 96 is fixedly secured while the rod 95 is distorted, to the side wall of the cassette holder 3 by two screws (FIG. 21).

Therefore, since the cassette holder 3 is associated with the torsion rod 95 to which distortion is applied, the cassette holder 3 is subjected to force which restores the distortion of the rod 95. Accordingly, avoidable is lending of the cassette holder 3 due to the application of external force.

Next, operation model will be described.

INITIAL STAGE

In the state where the cassette holder 3 is opened, the guide members 8 and 9 are positioned at generally center portion of the guide 7, the guide member 35 is positioned at initial end of the guide rail 34, and further, the tension arm 44 is positioned adjacent the guide member 8 upon clockwise rotation of the tension arm 44, and the pinch arm 46 is positioned adjacent the guide member 35 upon counterclockwise rotation of the pinch arm 46. The tape draw-out pins 8a, 9a, 35a of the guide members 8, 9, 35, the guide pin of the tension arm 44 and the pinch roller 46a of the pinch arm 46 are aligned approximately in-line, and are positioned at their standby positions positioned inwardly with respect to the lid of the tape cassette moved by the movable chassis 2.

Figure 5:
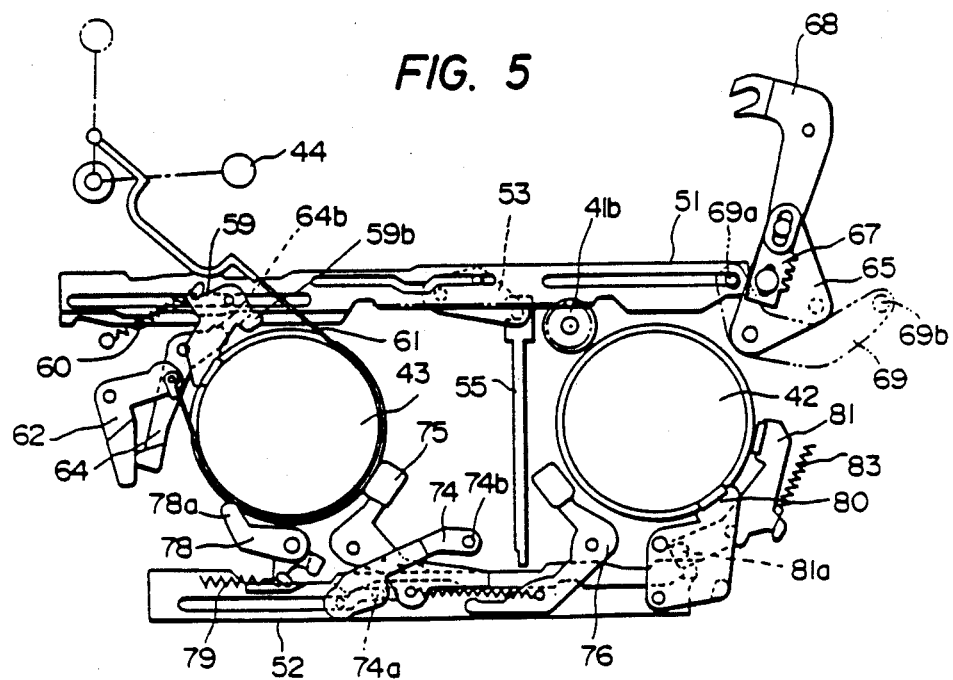
FIG. 5 is a plan view showing brakes driven by first and second sliders.
Figure 6:
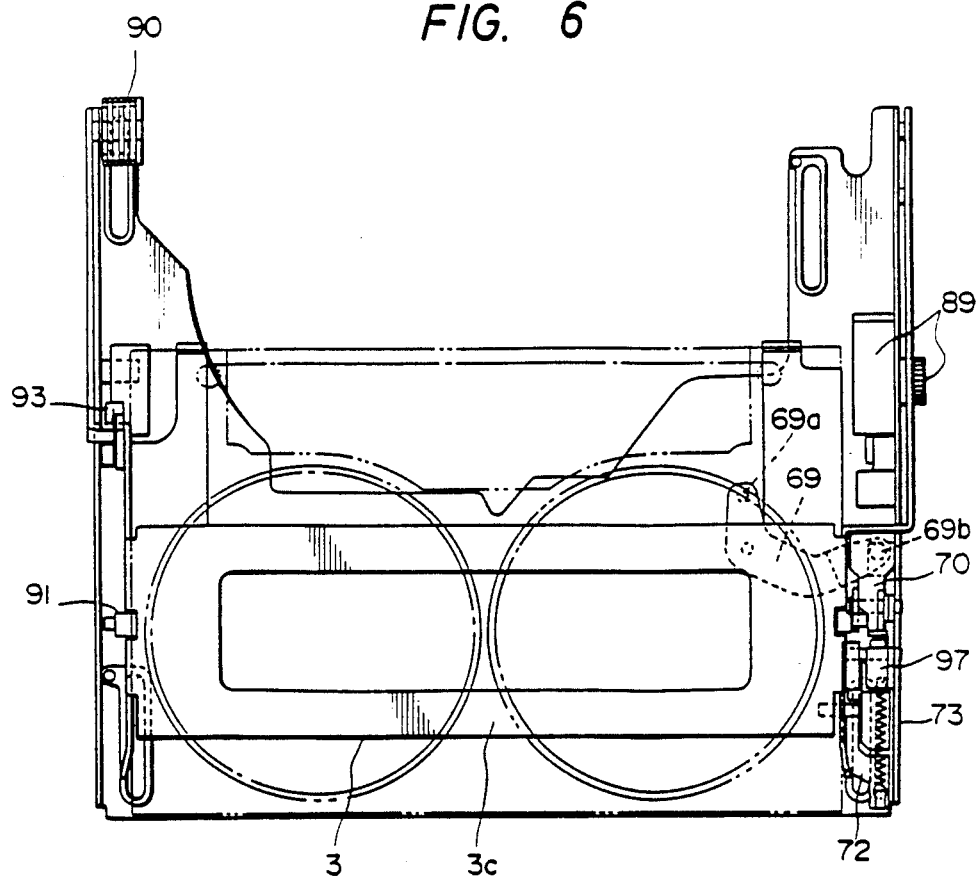
FIG. 6 is a plan view showing a part of the cassette holder.
Figure 7:
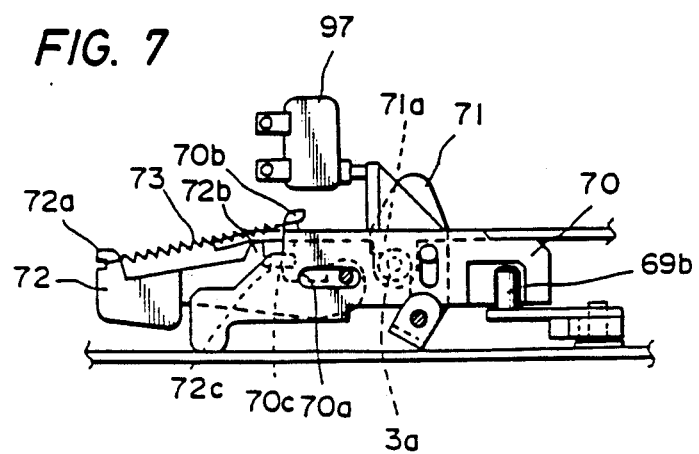
FIG. 7 is a side view showing a locking portion of the cassette holder in its locking state.

Further, the movable chassis 2 is at stand-by position frontwardly offset from the stationary chassis 1. Further, as shown in FIG. 5, the first and second sliders 51 and 52 are positioned at positions sightly right side with respect to their left ends. Therefore, the holder release lever 69 is at a rotational position in a clockwise direction.

Incidentally, FIG. 4 shows a timing-chart which represents respective state of the mechanical segments those controlled by the first and second sliders 51, 52, and the rotation drum motor, capstan motor 6 and the tape draw-out motor.

TAPE CASSETTE MOUNTING OPERATION

Figure 11:
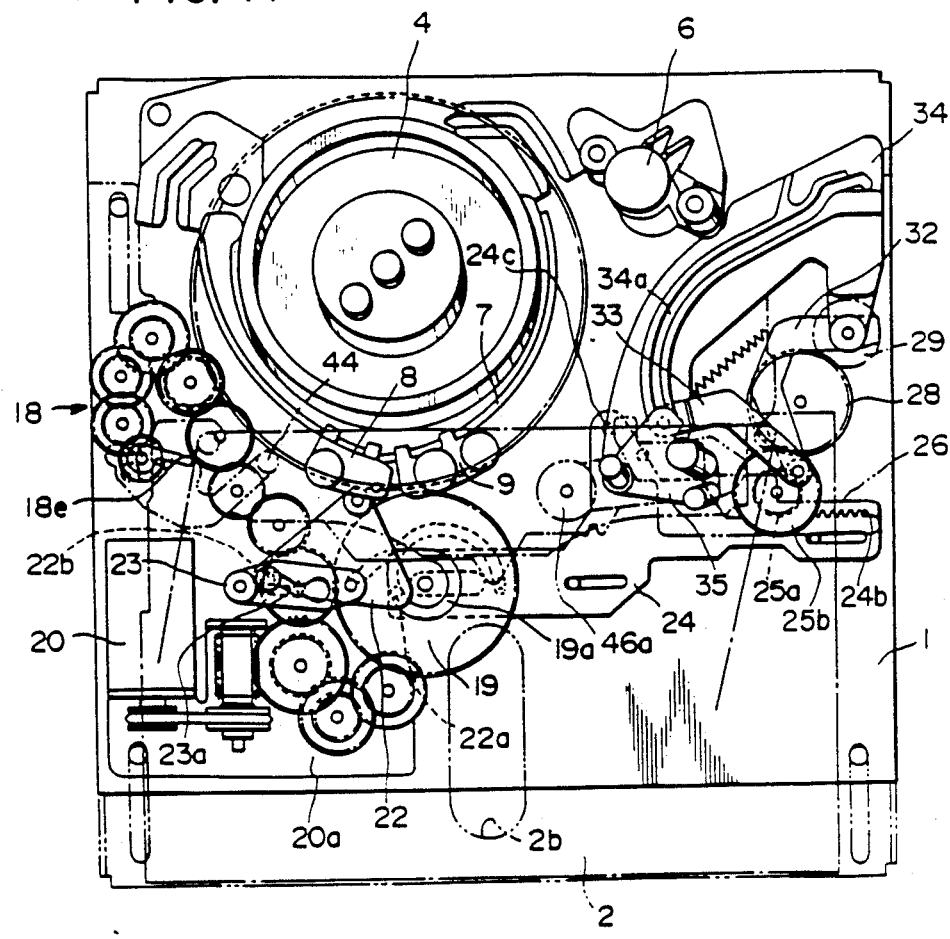
FIG. 11 is a plan view showing a state where a tape cassette is mounted.

When the tape cassette is inserted into the cassette holder 3, and the cassette holder 3 is depressed downwardly against biasing forces of the coil spring 90 and the spring 98, the lid opener 93, in abutment with the lower edge of the end of the tape cassette, is rotated by the pin 2f of the movable chassis 2 in accordance with descending motion of the cassette holder 3 against the biasing force of the coil spring 94. Therefore, the lid is opened by angular rotation of about 90 degrees for exposing the tape in the closed state of the cassette holder 3. In this state, the tape draw-out pins 8a, 9a, 35a of the guide members 8a, 9a, 35a, the tape draw-out portion of the tension brake 44, and the pinch roller 46a of the pinch arm 46 are positioned at a back surface of the tape (FIG. 11).

Figure 9:
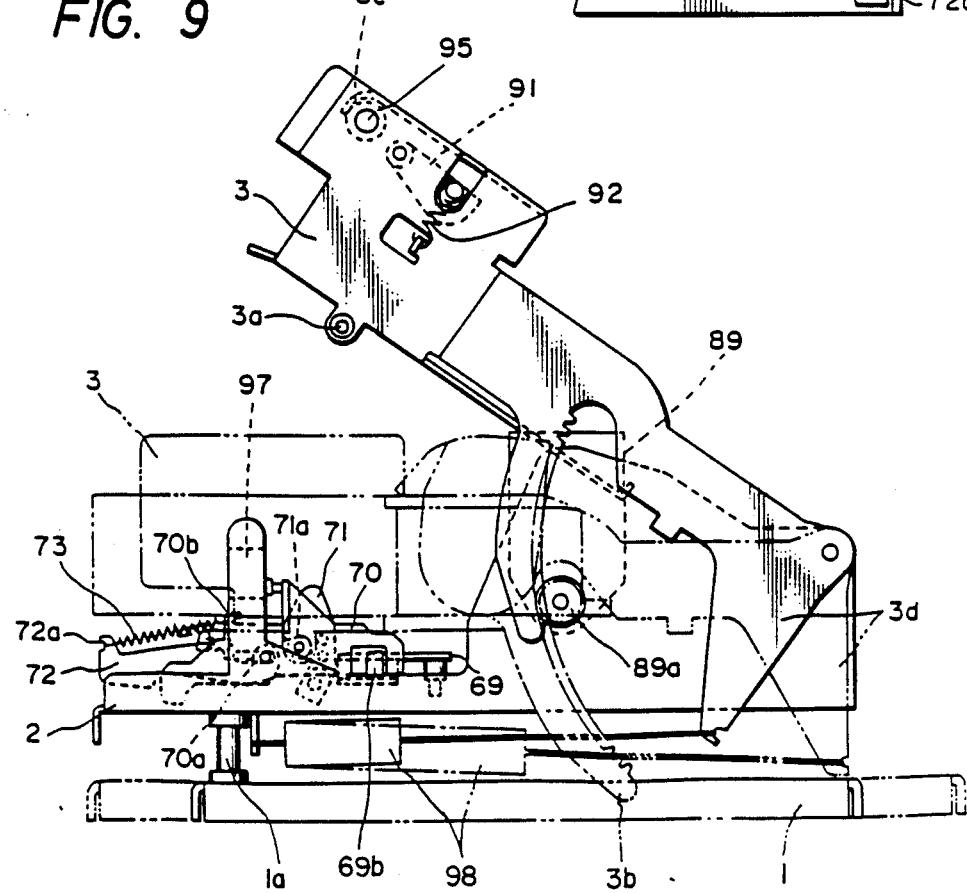
FIG. 9 is a side view showing release state of the cassette holder.

Further, when the cassette holder moves toward its descent position for falling down the upstanding collapsible member 72 by pressing the projection piece 72b of the member 72, the lock release holder 70 is moved frontwardly by the biasing force of the spring 73, so that the holder lock arm 71 is brought into engagement with the lock pin 3a, and the cassette holder 3 maintains its closing state (imaginary line in FIG. 9).

Figure 12:
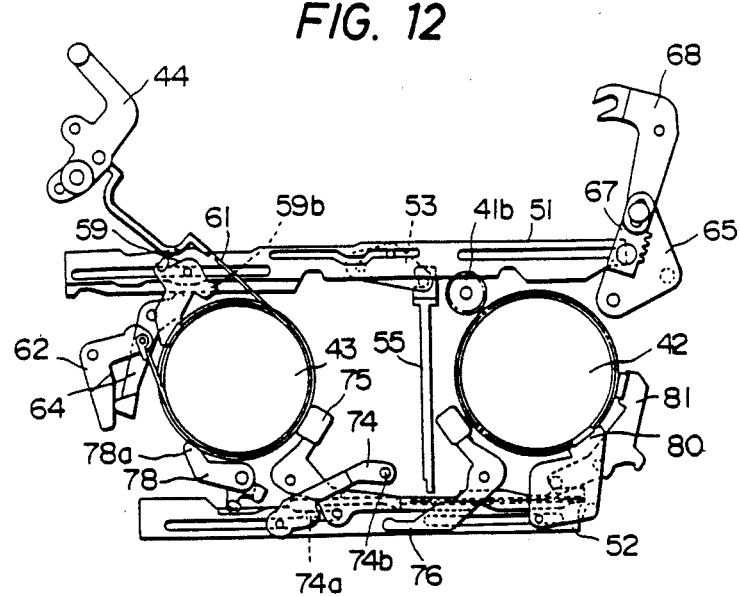

In the cassette mounting state i.e., cassette stand-by state, mechanical segments controlled by the first and second sliders 51 and 52 and motors are not changed in their states from the initial state (FIG. 12).

TAPE LOADING OPERATION

When the tape cassette is mounted and the lock release slider 70 is moved frontwardly, a part of the lock release slider 70 turns ON the switch 97.

When the switch is turned ON, energized are rotary drum motor, capstan motor 6, tape draw-out motor 20, and mode switching motor 41. Here, when the rotation of the mode switch motor 41 is started, the first and second sliders 51 and 52 are moved, so that the braking to the tape cassette is released by the brake release pin 74b of the cassette brake arm 74 as shown in FIG. 4, to thereby enables tape drawing out operation.

Figure 13:
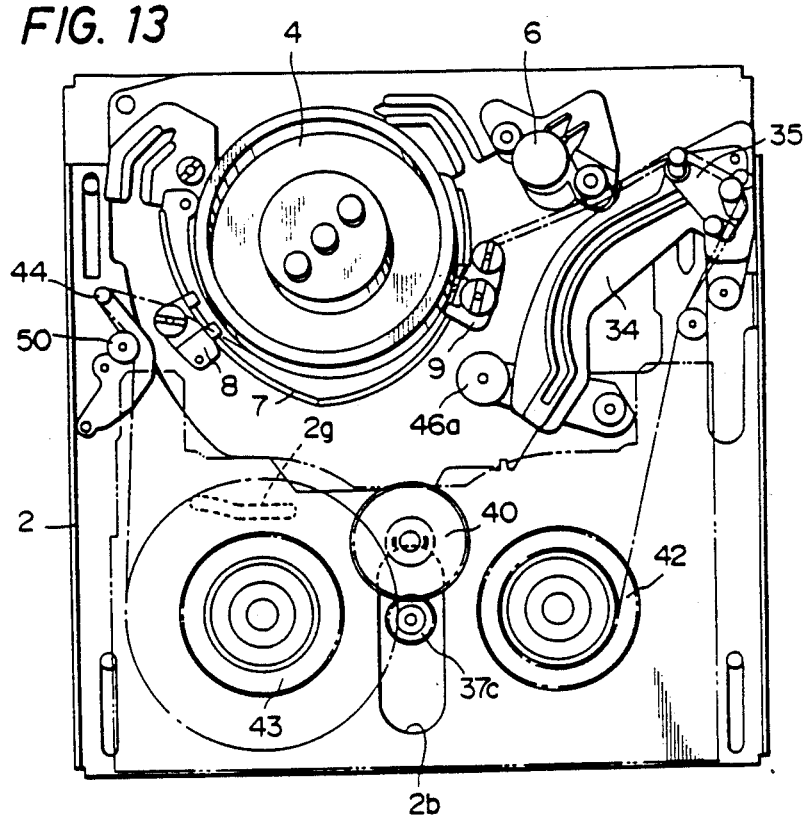
FIG. 13 is a plan view showing tape loading state.
Figure 14:
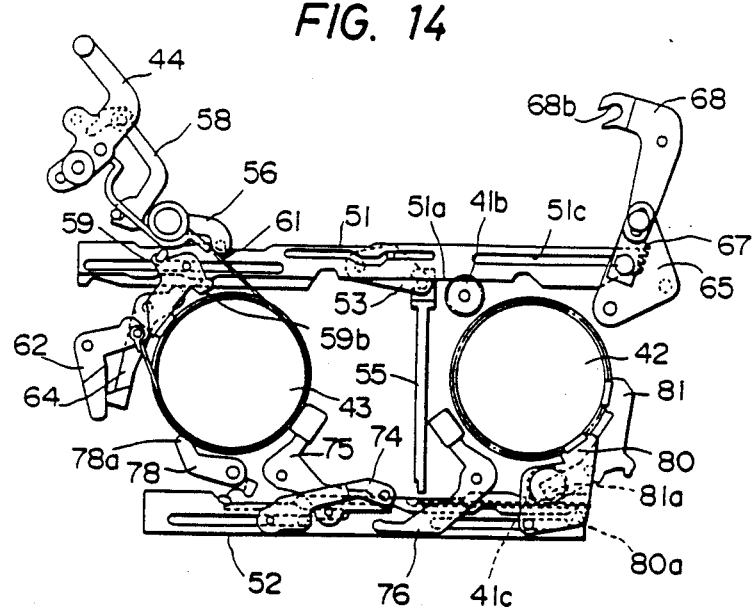
FIG. 14 is a plan view showing brakes in FIG. 13.

In this state, when rotation of the tape draw-out motor 20 is started, the cam gear 19 is rotated through the deceleration gear 20a, and therefore, the ring gear 10 and the gear plate 14 are rotated in directions opposite to each other through the linkage gear 21 and the gear train 18. As a result, the guide members 8 and 9 are moved along the guide 7, so that the tape draw-out pins 8a and 9a of the guide member 8, 9 draw-out the tape. Further upon rotation of the cam gear 19, the slide plate 24 is moved and the gears 25, 28, 29 and the rotary wheel 30 are rotated, so that the guide member 35 is moved along the guide rail 34. As a result, the tape draw-out pins 35a~35c of the guide member 35 draw-out the tape. Furthermore, when the cam gear 19 is rotated and eighth gear 18d of the gear train 18 is rotated, the locking pin 44q of the tension arm 44 is released, so that the tension arm 44 is rotated by the biasing force of the spring 45 for drawing out the tape. When the slide plate 24 is moved, moved is the laterally movable plate 26 whose movement by the biasing force of the spring 27 has been restrained by the pin 24c of the slide plate 24. Therefore, rotated is the pinch arm 46 by the biasing force of the spring 49, the rotation of the arm having been restrained by the laterally movable plate 26, so that the tape is drawn out. In the tape loading operation, the tape draw-out operation by the guide member 35 is carried out at a timing faster that the timing at which tape draw-out operation is carried out by the guide member 8 and 9 as shown in FIG. 13. This difference in timing is required for setting the tape at a proper position with respect to the capstan shaft 6a.

Incidentally, in the tape draw-out operation, since the main brake 75 for the supply reel stand and the reversal brake 59 for the supply side are in pressure contact with the supply reel stand 43, the tape is drawn from the tape-up reel stand 42 without any rotation of the supply reel stand 43. Further, even though the take-up side soft brake 80 is in contact with the take-up reel stand 42, the take-up reel is still rotatable because of small contact force of the soft brake 80, yet a small braking force is applied to the take-up reel stand 42 for preventing the tape from slacking at tape draw-out operation.

Further, in the tape draw-out operation, in case where the tape is not wound or is only slightly wound around the take-up reel stand 12 a reader tape detection unit (not shown) detects this fact, and the tape is taken-up for a certain period by tape rewinding operation mentioned later for enabling tape draw-out operation. After that the above-described operation is performed.

As described above, when the guide members 8, 9, 35 are moved to the terminal end portion of the guide, the tape is wound around the rotary drum 4, and at the same time, a given tension is applied to the tape by the tension arm 44, and the tape is also trained around the pinch roller 46a of the pinch arm 46.

Figure 15:
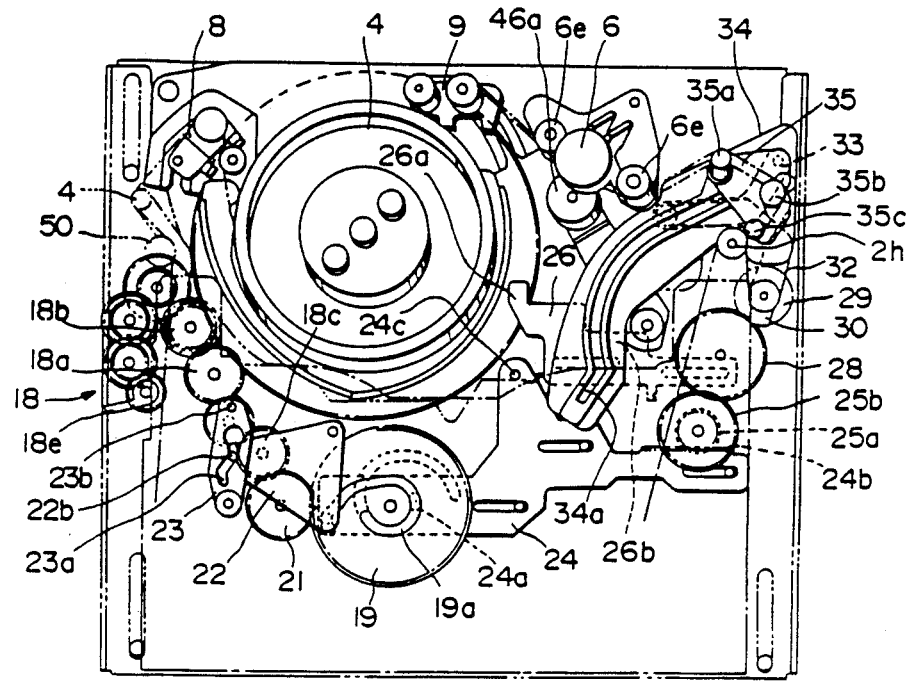
FIG. 15 is a plan view showing terminal phase of the tape loadings.

Upon completion of entire loading operation, the cam gear 19 is still rotated, after the rotation of the linkage gear 21 is stopped. Therefore, the rotary arm 23 is rotated through the rotary plate 22 which is subjected to control by the cam groove 19a, so that the pin 23a of the rotary arm 23 a moved along the guide groove 2g of the movable chassis, to thereby move the latter frontwardly. The tape draw-out motor 20 is deenergized when the movable chassis 2 is overlapped with the stationary chassis 1, and the rotation of the cam gear 19 is also stopped. This state indicates the terminal phase of the tape loading operation (FIG. 15).

When the guide member 35 is at terminal end portion of the guide, the tape is taken-up into the tape cassette through two tape draw-out pins 9a of the guide member 9, capstan shaft 6a, guide pin 6e fixed at both sides of the captain shaft 6a, three tape draw-out pins 35a~35c of the guide member 35 and guide pin 2h fixed to the movable chassis 2. Here, height of the tape terminal end, which tape is wound around the drum 4, is different from a tape inlet portion of the tape cassette.

Therefore, in accordance with this invention, three tape draw-out pins 35a~35care provided at the guide member 35. With the structure tape from the drum 4 is displace to a height equal to the height of the tape inlet portion of the tape cassette, and the slantingly directed tape is directed in horizontal direction by the tape draw-out pin 35b to thereby enable the tape to the wound into the tape cassette. By disposing the two tape draw-out pins 35a, 35b at the guide member 3, minimized is the distance 1 from a terminal end position of the tape wound around the drum 4 to the position of the tape draw-out pin 35b. Therefore, compact product results (see solid line in FIG. 3).

At the tape loading and at a phase where the movable chassis 2 is moved frontwardly, the reciprocal gear 40 is moved toward its intermediate position by the return member 85, in the intermediate position, eliminated is the engagement of the reciprocal gear 40 with either one of the gear portions 42c, 42d, 43c, 43d of the take-up and supply reel stands 42 and 43.

QUICK FEED AND REWINDING OPERATION

Figure 16:
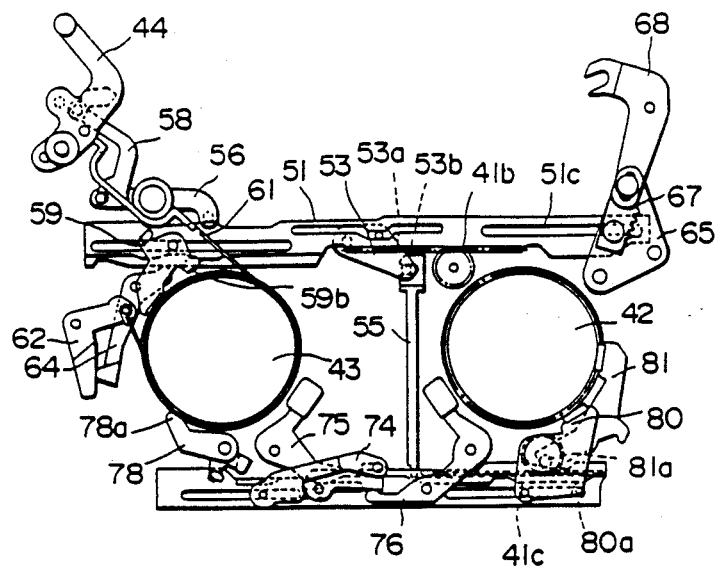
FIG. 16 is a plan view showing brakes in FIG. 15.

In the tape loading state, when the forward feel switch is operated, the mode switching motor 41 is rotated to move the first and second sliders 51, 52, to thereby render each of the motors and brakes to be their states shown in FIG. 4. That is, the rotary drum 4 is stand rotated, and the capstan motor 6 is rotated after completion of the operation of the mode switching motor 41. Further, the supply reel side main brake 75 which has been in pressure contact with the supply reel stand 43 is moved away from the supply reel stand 43, and feed brake 78 and the take-up side rewind brake 81 are in contact with the supply reel stand 43 and the take-up reel stand, respectively for applying small braking force thereto, the thus prevent the tape from its slacking. Further, the preventive arm 58 is rotated, and the tension arm 44 is locked for preventing free movement thereof. The arm 44 is at its external fixed position. As a result, tension application to the tape by the tension arm 44 is avoidable during tape travel (FIG. 16).

Further, upon rotation of the rotary plate 53, the collapsible lever 55 is moved to its upstanding position for rotating the bifurcated arm 38 downwardly, thereby to move the vertically movable arm 39 toward its descent position. When the vertically movable plate 39 is moved to its descent position, the reciprocal gear 40 rotatably supported on the fixing shaft 39b of the arm 39 is also moved downwardly, so that the reciprocal gear 40 is moved to a position confronting the lower gear portions 43d, 42d of the take-up reel stand 43 and the supply reel stand 42. In this state, when the capstan motor 6 is rotated in the tape take-up direction, to pulley 37b is rotated in clockwise direction by way of the belt 37e. Therefore the gear 37c is also rotated in clockwise direction, and the reciprocal gear 40 is rotated in a counter clockwise direction and is moved in clockwise direction, so that it is engaged with the lower gear portion 43d of the take-up reel stand 43. As a result, driving force is directly applied to the take-up reel stand 43 for tape winding.

When a stop switch not shown is operated, the capstan motor 6 is deenergized, and forward feed operation is terminated.

The tape rewinding operation would be the same as that of the forward feed operation except that, the capstan motor 6 is reversely rotated to rotate the reciprocal gear 40 in a clockwise direction and the move the reciprocal gear 40 in a counterclockwise directions, to that the reciprocal gear 40 is brought into meshing engagement with the lower gear portion 42d, to thus provide tape winding around the supply reel stand 42.

STOP OPERATION

Next described in operation for stopping tape running at the above-described quick forward feed, reminding and a forward play and reverse play the latter two will be described later.

Figure 17:
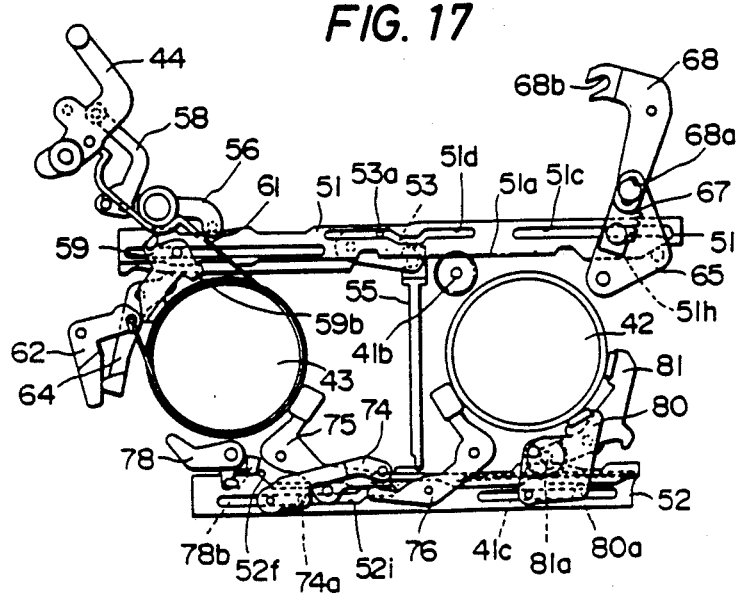
FIG. 17 is a plan view showing brakes in stop.

When a stop switch not shown in operated, stopped are rotations of rotary drum motor and capstan motor 6 as shown in FIG. 4. Further the first and second sliders 51 and 52 are further moved, and the supply side main brake 75 and the tape up side main brake 76 are in press-contact with the reel 42 and reel 43, respectively, and simultaneously, remaining brakes 59, 78, 80, 81 are moved away from the reels 42, 43. Further, since the preventive arm 58 is slightly retracted by way of the rotary arm 56, the tension arm 44 is loosely fixed with a degree of freedom to such a extent that the tape provides a small amount of slacking (FIG. 17).

Further, since the rotary plate 53 is returned to its original position, the collapsible lever 55 is fallen down, and the reciprocal gear 40 is moved upwardly by operation sequence which is reverse to the operations in quick feed and rewinding mentioned above. Therefore, the reciprocal gear 40 is returned to a position confronting the upper gears 42c and 43c of the reel stands 42 and 43. At the same time, the reciprocal gear return member 85 and the reciprocal gear return lever 87 are moved to a direction permitting the reciprocal gear 40 to move the a direction away from the both reel stands 42, 43, so that the reciprocal gear 40 is returned to its intermediate position.

FORWARD PLAY OPERATION

Figure 18:
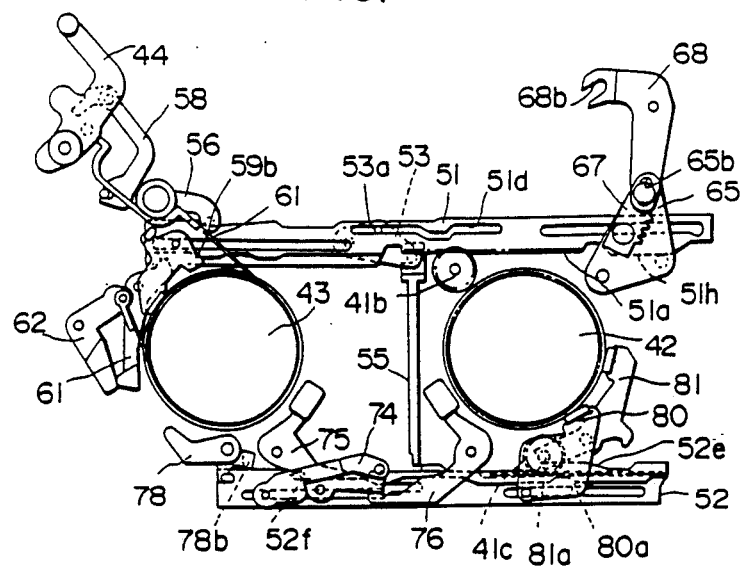
FIG. 18 is a plan view showing forward play phase.

In the above described stop phase, when a forward play switch not shown in operated, the rotary dram motor and the mode switch motor 41 are energized as shown in FIG. 4, and the first and second sliders 51, 52 are further displaced form the stop operation position, and thereafter, the mode switch motor 41 is stopped. By this movement, the supply side main brake 75 and the take-up side main brake 76 are moved away from the supply reel stand 43 and the take-up reel stand 42, respectively, and at the same, the rotary arm 56 is moved to allow the preventive arm 58 to retract from a moving locus of the tension arm 44 so that tension is applied to the tape by the tension arm 44. Further, the brake lever 62 is moved by way of the control lever 64 for pulling the tension brake 61, to thereby fasten the supply reel stand 43 for braking. As a result, tape slacking at tape draw-out operation is avoidable (FIG. 18).

On the other hand, since the reciprocal gear return member 85 is moved to a position where the member 85 is retracted from them moving locus of the reciprocal gear 40, the reciprocal gear 40 is of freedom. In this state, since the capstan motor 6 is energized and the reciprocal gear 40 is rotated in counterclockwise direction, the reciprocal gear 40 is forcibly moved in clockwise direction in association with counterclockwise rotation of the reciprocal gear return member 85. Accordingly, the reciprocal gear 40 is brought into meshing engagement with the upper gear portion 43c of the take-up reel stand 43. As a result, the take-up reel stand 43 is subjected to frictional resistance while being rotated for tape winding.

Further, in accordance with the movement of the first slider 51, the triangular plate 65 is rotated, so that the pinch control plate 68 is moved through the regulation plate 67. In this case, since the locking pin 47b of the auxiliary arm 47 is inserted into bifurcated portion 68b of the pinch control plate 68, the auxiliary arm 47 is pulled toward the capstan in response to the rotation of the pinch control plate 68. Therefore, the pinch arm 46 is also pulled toward the capstan through the spring 48, and the pinch roller 46a is brought to pressure contact against the capstan shaft 6a by the biasing force of the spring 48 with interposing the tape between the roller 46a and the shaft 6a.

Figure 19:
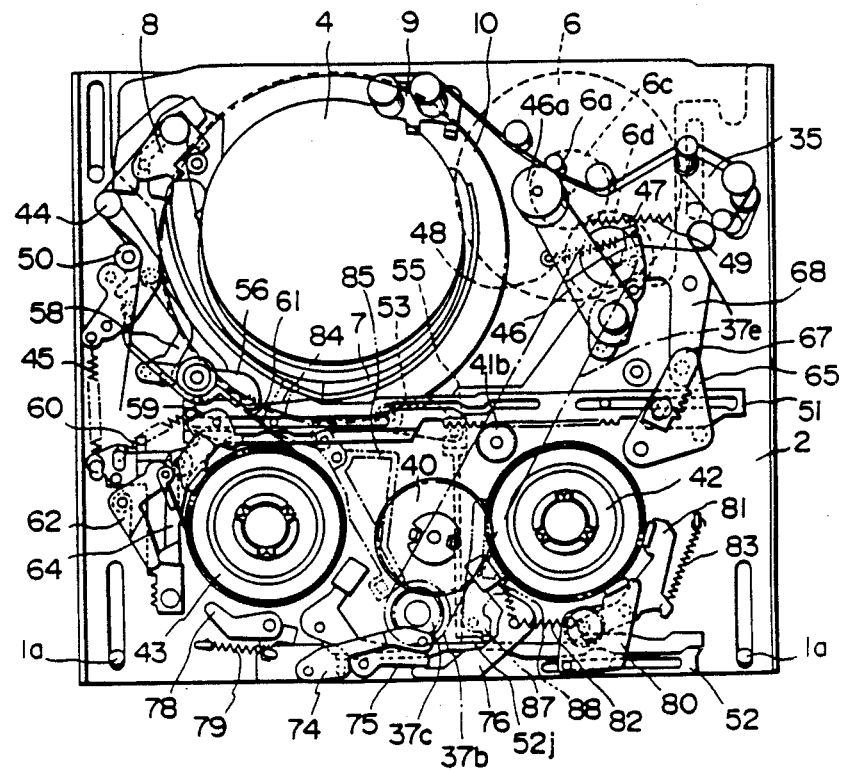
FIG. 19 is a plan view showing overall arrangement.

Upon completion of the above operation, since the capstan motor 6 is rotated, tape travel at a given speed is initiated for forwardplay (FIG. 19).

The toward play described above concerns its operation starting from stop phase. When the forward play switch is operated form quick feed or rewinding operation, the forward play is performed after the above described stop operation.

REVERSE-PLAY OPERATION

When reverse play operation is started from the quick feed, rewinding or stop phase, the reverse play is performed subsequent to the above-described forward play operation. When the reverse play switch not shown is operated, similar to the forward play operation, the rotary drum motor and the capstan motor 6 are energized. Further the first and second sliders 51, 52 are further moved to their rightmost positions.

Figure 20:
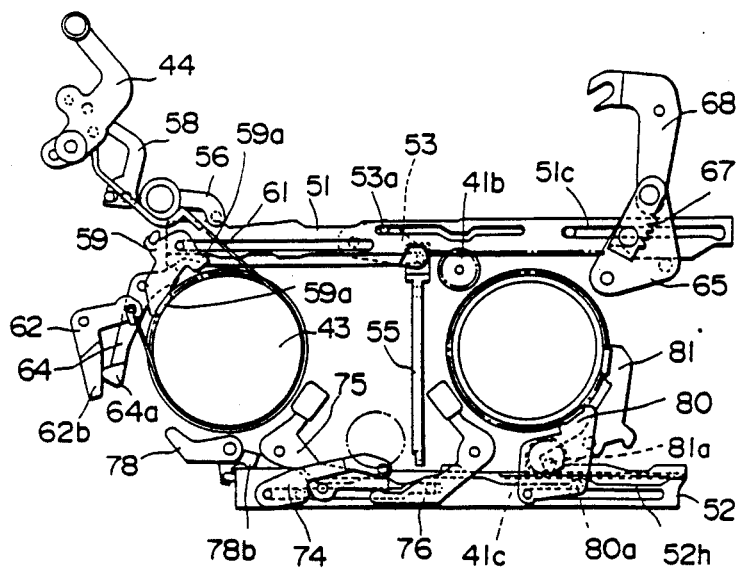
FIG. 20 is a plan view showing brake sin reverse play.

In the state, supply side reverse brake 59 is in abutment with the supply reel stand 42 and take-up side soft brake 80 and the take-up side remind brake 81 are in abutment with the take-up reel stand 43 for applying braking force to these reel standards to such extend that the tape slacking is avoidable. Further, the tension arm 44 is brought to its fixed position similar to the above described quick feed and rewinding operations, and simultaneously, the brake lever 62 is moved to its original position for releasing brake force which is given by the tension brake 61. Furthermore, the pinch arm 46 and the reciprocal gear 40 are in their phases similar to the forward play. That is, the pinch roller 46a is pressed against the capstan shaft 6a interposing the tape therebetween (FIG. 20). The reciprocal gear 40 is at a position confronting the upper gear portions 42c, 43c of the reel stands 42 and 43.

In this state, since the capstan motor 6 is reversely rotated, the reciprocal gear 40 is rotated in counterclockwise direction while the reciprocal gear return bar 87 is moved in counterclockwise direction. Therefore, the gear 40 is forcibly engaged with the upper gear portion 43c of the supply reel stand 43 for winding the tape. As a result, the tape travel is started at constant speed for reverse play.

EJECT OPERATION

Figure 8:
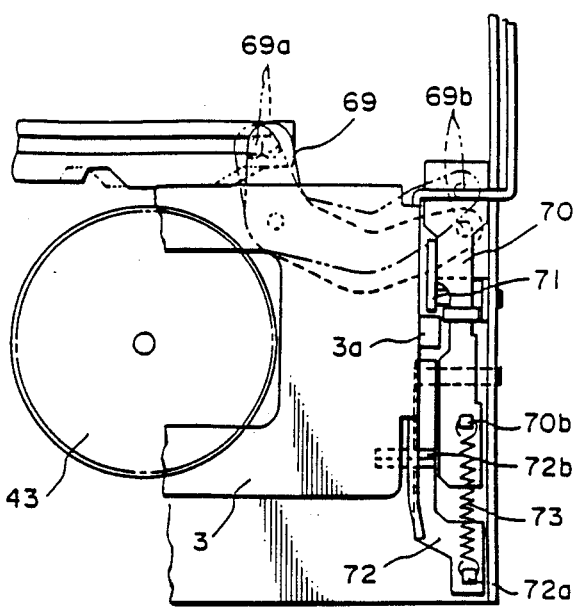
FIG. 8 is a plan view of FIG. 7.

When an eject switch not shown is operated, electrical current is applied to the model switch motor 41, and the first and second sliders 51 and 52 are moved to their leftmost positions and are stopped thereat by way of output gears 41b, 41c. For this, the holder release lever 69 is displaced in accordance with the guidance of the deforming groove 51i formed is the first slider 51, so that the lever 69 is moved in counterclockwise direction against the biasing force of the spring 73 (FIG. 8).

Therefore, the lock release slider 70 is moved to its retracted position for swinging the holder lock arm 71, so that the arm 71 is disengaged from the lock pin 3a. When the locking of the cassette holder 3 is release, the holder is released by the biasing force of the coil spring 90 and the spring 98. In this case, the cassette holder 3 is gradually pivoted by the damper unit 89.

Figure 10:
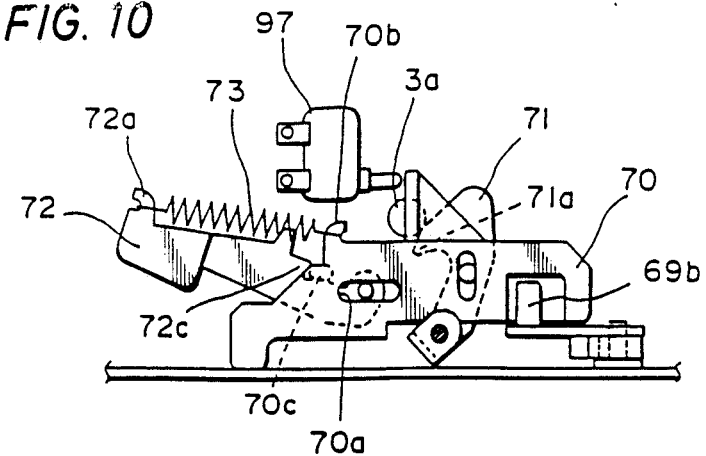
FIG. 10 is a side view showing a locking portion of the cassette holder.

Further, when the lock release slider 70 is retracted, the collapsible member 72 is moved to its upstanding position by the biasing force of the spring 73, and the stepped portion 72c is at a position in alignment with the moving locus of the projected portion 70c of the lock release slider 70. Then, current is applied to the mode switch motor 41 in reverse direction for returning the first and second sliders 51, 52 to their initial position (stand-by mode). Therefore, the holder release lever 69 is moved in clockwise direction and the lock release slider 70 is urged frontwardly by the biasing force of the spring 73. However, since the stepped portion 72c of the collapsible member 72 is in abutment with the projected portion 70c of the lock release slider 70, the frontward movement of the slider 70 is restrained. As a result, the slider 70 is stopped at its rearward position and off state of the switch 97 is maintained (FIG. 10).

As described above, according to the present invention, the third guide member disposed at downstream side of the capstan shaft is provided with the two tape draw-out pins which allows distorted tape, which is passed through the capstan shaft, to be linearly extended and to regular at a height the same as the height of reel stand of the tape cassette, after the tape is drawn out from the tape cassette. Therefore, the tape is regularly wound in the tape cassette in stabilized fashion even if the tape travelling path length is short end. As a result, a compact tape recorder results.

It is an object of the present invention to overcome the above-described drawbacks, and to provide an improved brake mechanism in a tape recorder, in which a single slider controls two main brakes, for enabling various operations required in each of the operation modes, thereby to reduce mechanical parts, to thus provide simple construction at low cost with minimizing mechanical brake-down.

In order to attain the above-mentioned object, the present invention provides a slider movable in response to mode switching operation; a first main brake pivotably supported on a chassis and having a pin engageable with a cam of the slider, the first main brake being movable in accordance with the movement of the slider and being movable toward and away from a first reel stand; and a second main brake pivotably supported on the chassis and having a pin engageable with the cam of the slider. The second main brake is movable in accordance with the movement of the slider and is movable toward and away from the second reel stand, the first main brake is controllable by the movement of the second main brake.

This invention is provided in light of such technical standpoint. A tape recorder of this invention includes a pinch roller mounted on a movable chassis, and the making use of two members for providing pressure contact with the capstan. Therefore, the movement of the pinch roller is performed independently of the movement of the movable chassis.

In order to attain this object, a pinch roller is mounted on a movable chassis movable on a stationary chassis, and the pinch roller is moved in dual operational stages by two members supported on the movable chassis, so that the pinch roller is moved toward and away from the capstan.

As described above, in the present invention the third guide member is provided for drawing out the tape and for aligning the tape height with the height of the rotary drum prior to the tape draw-out operation by the first and second guide members which move the tape drawn out of the tape cassette along the outer peripheral surface of the rotary drum and wind the predetermined amount of the tape therearound. Therefore, tape winding over the rotary drum by the first and second guide members can be performed without fail. Further, tape winding is attainable in a relatively simplified tape travelling path, and an ecconomical product having simple construction results with stabilized operational mode and with reducing mechanical hindrance.

As described above, in the present invention, operational timing of respective components which are requisite elements for tape recording and reproduction are controlled by a single cam gear, and therefore recording and reproducing operation can be promptly initiated, and further economical product results because of reduced numbers of mechanical segments.

As described above, according to the present invention the rotary drum, the capstan, the tape loading mechanism and drive motors for driving these segments are mounted on the one of the chassis, while the reel stands, the mode switching mechanism and the drive motor for driving these segments are mounted on the other chassis.

Therefore, optimum braking control is performable for each of the operation modes, and accordingly, the reel is subjected to optimum braking force, and prompt and accurate mode switching operation is attainable.

As described above, according to this invention, the cassette holder is disposed opened and closed on the movable chassis slidable on the stationary chassis for mounting the tape cassette on the reel stands, and further, the locking means is also provided to the movable chassis for maintaining closing state of the cassette holder. When the cassette holder is closed with respect to the movable chassis, the tape cassette inserting portion is closed by the cassette holder. Accordingly, numbers of mechanical parts is reduced, to facilitate easy assembling, and as a result, light weight and compact product results with minimized cost.

As described above, in the present invention, the single slider controls each of the main brakes in accordance with each modes. Therefore, braking timing between the two brakes is accurately attainable, and accordingly, sufficient braking force is applied with product is manufactured at low cost and mechanical brakedown is reduced because of minimized member of mechanical parts.

As described above, in this invention, the pinch roller is mounted on the movable chassis movable on the stationary chassis, and members are provided at every operational stages for moving the pinch roller and press-contacting the latter to the capstan. Therefore, control to the pinch roller is performed at every operational stage and independent of the moving timing, thereby to facilitate moving timing.

We claim:

1. A tape recorder comprising:
a stationary chassis and a movable chassis relatively movable between a tape loading state where a tape is loaded in said recorder and a tape unloading state where the tape is unloaded from said recorder;
a rotary drum having a magnetic head, a capstan and a tape loading mechanism for loading said tape in said recorder, said rotary drum being provided on said stationary chassis;
a pair of reel stands provided on said movable chassis; one of said pair for supplying said tape and another of said pair for winding said tape; and
a mode switching mechanism for switching said recorder from said tape loading state to said tape unloading state, said rotary drum, said capstan and a tape loading motor being provided on said stationary chassis, and said mode switching mechanism being provided on said movable chassis, wherein said tape loading mechanism includes first and second guide members adopted to be movable along an outer periphery of said rotary drum, said guide members having tape draw-out pins for drawing out said tape from said tape cassette and a third guide member adapted to draw-out said tape in cooperation with said first and second guide members, said third guide member having a first tape draw-out pin which changes height of said tape draw-out position to a height the same as that of said tape cassette position; and said third guide member also having a second tape draw-out pin for directing said tape subjected to positional change by said first pin to a direction parallel with the tape cassette.

2. A cassette mounting device in a tape recorder, comprising:
a stationary chassis having a capstan and a magnetic head mounted thereon;
a movable chassis movable on said stationary chassis;
a tape drive means including reel stands disposed on said movable chassis;
a cassette holder disposed, in an opened position where a cassette can be inserted or in a closed position where said cassette can be disposed in said recorder, on said movable chassis, a tape cassette being disposed on said reel stand when said tape cassette is inserted into said holder and said holder is in said closed position;
locking means mounted on said movable chassis for preventing said cassette holder from opening once in said closed position; and a tape draw-out means, said tape draw-out means including first and second guide members adopted to be movable along an outer periphery of said rotary drum, said guide member shaving tape draw-out pins for drawing out said tape from said tape cassette and a third guide member adapted to draw-out said tape in cooperation with said first and second guide members, said third guide member having a first tape draw-out pin which changes height of said tape draw-out position to a height the same as that of said tape cassette position and said third guide member also having a second tape draw-out pin for directing said tape subjected to positional change by said first pin to a direction parallel with the tape cassette.

3. A tape recorder characterized by:

a stationary chassis mounting having a capstan and a magnetic head mounted thereon;

a movable chassis movable on the stationary chassis in a first direction;

a pinch roller rotatably supported on the movable chassis;

a movable plate supported on the movable chassis and engaged with said pinch roller for moving the pinch roller toward the capstan, said movable plate being movable in a second direction transverse to said first direction; and a pinch control plate rotatably supported on the movable chassis and engageable with said pinch roller for further moving the pinch roller to provide pressure contact with the capstan after the movable chassis is moved on the stationary chassis.

4. A tape recorder in which a tape is drawn out from a tape cassette and is wound around a rotary drum having a magnetic head by a predetermined tape amount for recording and reproducing information, said tape recorder comprising:

a stationary chassis having the rotary drum secured thereto;

a movable chassis movable with respect to said fixed chassis between a tape loading position and a tape unloading position;

a guide member slidably disposed on said stationary chassis for withdrawing the tape from said cassette;

a tension arm rotatably attached to said movable chassis for applying tension to said tape;

a pinch roller rotatably disposed on said movable chassis for guiding said tape; and a cam gear driven by a motor, said cam gear including cam grooves formed on opposite sides thereof and a gear portion formed on the outer periphery thereof, wherein movement of said guide member is controlled by said gear portion of said cam gear for tape loading, movement of said pinch roller is controlled by one of said cam grooves of said cam gear, and movement of said movable chassis is controlled by another of said cam grooves of said cam gear.

* * * * *